July 13, 1965 P. M. LUCAS ETAL 3,194,891

SWITCHING NETWORK

Filed April 13, 1962 12 Sheets-Sheet 1

INVENTORS

PIERRE M. LUCAS & MICHEL M. ROUZIER

BY

Abraham A. Saffitz

ATTORNEY

July 13, 1965 P. M. LUCAS ETAL 3,194,891

SWITCHING NETWORK

Filed April 13, 1962 12 Sheets-Sheet 2

INVENTORS

PIERRE M. LUCAS & MICHEL M. ROUZIER

BY

Abraham A. Saffitz

ATTORNEY

INVENTORS
PIERRE M. LUCAS & MICHEL M. ROUZIER
BY
Abraham A. Saffitz
ATTORNEY

SWITCHING NETWORK

Filed April 13, 1962 12 Sheets-Sheet 4

INVENTORS
PIERRE M. LUCAS & MICHEL M. ROUZIER
BY
Abraham A. Saffitz
ATTORNEY

INVENTORS
PIERRE M. LUCAS & MICHEL M. ROUZIER
BY
Abraham A. Saffitz
ATTORNEY

July 13, 1965 P. M. LUCAS ETAL 3,194,891

SWITCHING NETWORK

Filed April 13, 1962 12 Sheets-Sheet 6

INVENTORS
PIERRE M. LUCAS & MICHEL M. ROUZIER
BY
Abraham A. Saffitz
ATTORNEY

INVENTORS
PIERRE M. LUCAS & MICHEL M. ROUZIER
BY
Abraham A. Saffitz
ATTORNEY

July 13, 1965 P. M. LUCAS ETAL 3,194,891

SWITCHING NETWORK

Filed April 13, 1962 12 Sheets-Sheet 8

INVENTORS
PIERRE M. LUCAS & MICHEL M. ROUZIER
BY
Abraham A. Saffitz
ATTORNEY

INVENTORS
PIERRE M. LUCAS & MICHEL M. ROUZIER
BY
Abraham A. Saffitz
ATTORNEY

July 13, 1965 P. M. LUCAS ETAL 3,194,891

SWITCHING NETWORK

Filed April 13, 1962 12 Sheets-Sheet 10

INVENTORS
PIERRE M. LUCAS & MICHEL M. ROUZIER
BY
Abraham A. Saffitz
ATTORNEY

INVENTORS
PIERRE M. LUCAS & MICHEL M. ROUSIER
BY
Abraham A. Saffitz
ATTORNEY

July 13, 1965 P. M. LUCAS ETAL 3,194,891

SWITCHING NETWORK

Filed April 13, 1962 12 Sheets-Sheet 12

INVENTORS
PIERRE M. LUCAS & MICHEL M. ROUZIER
BY
Abraham A. Saffitz
ATTORNEY

United States Patent Office 3,194,891
Patented July 13, 1965

3,194,891

SWITCHING NETWORK

Pierre M. Lucas, 20 Rue Tariel, Issy-les-Moulineaux, France, and Michel M. Rouzier, 15 Chemin de la Sabliere, Vauhallan, France Filed Apr. 13, 1962, Ser. No. 187,232
Claims priority, application France, Apr. 15, 1961, 858,869
11 Claims. (Cl. 179—18)

This invention relates to a telephonic switching network intended to operate under the control of a general purpose computer of known type which receives from a scanning device, also of known type, the necessary data relating to the service condition of a number of telephone lines and circuits. It is known that a telephonic automatic switching unit has for its purpose to connect a number of telephonic lines two by two, according to the traffic demands, through the intermediary of circuits or channels suitable for transmitting audio frequencies. These automatic switching systems can be divided into two groups:

(1) The automatic switching units known as "time-divided" in which communication between two subscribers' lines is effected by the transmission of a modulated electric pulse over a multiplex channel, concurrently with the transmission of a large number of pulses of the same nature which are responsible for other communications;

(2) Switching units employing space-division of the connection elements, in which for each communication between two telephonic lines an individual path is employed, physically distinct from all the other paths which can be simultaneously established by the other pairs of lines.

The present invention applies exclusively to automatic switching units of the space-division kind and these only will be considered in the following.

In the space-division automatic switching units the switching operations necessary for the establishment and the breaking of connections between pairs of telephonic lines are carried out in a connection network under the control of suitable logical devices which receive information relating to the service condition of the telephonic lines and of the various elements of the switching network and which distributes the connection and disconnection orders which are responsible for ensuring the flow of traffic to the extent of the available means.

The electronic connection networks generally comprise a large number of crosspoints constituted by cold cathode gas-filled diodes divided into a certain number of stages, and the connection of two given telephonic lines is effected by applying a marking potential to the two ends of the network to be connected. This potential energizes, at a low current flow, the free crosspoints which are connected to these extremities and fans out from stage to stage up to a certain number of median junctions. Among the median junctions which are thus marked on both sides, the selection which determines the choice of a path can be made either in a random manner according to the individual characteristics of the available crosspoints to which the marking potential is applied, or by a systematic choice.

From this propagation of the marking through the fan arrangements in series, it results that a tube of the first stage has flowing through it the sum of the currents which flow through the tubes of the second stage to which it is connected and each of which has flowing through it the sum of the currents which flow through the tubes of the third stage to which the marking has spread. As a consequence the tubes must be capable of passing a current of very variable magnitude according to their position in the network and the number of available junctions which are connected to them; the operational tolerances of the system are thus rather small and the current consumption is high for the duration of the marking. Various arrangements suitable for reducing these disadvantages of the spreading of the marking through an over-extensive fan-out have been proposed. In the American specification No. 2,779,822 of R. W. Ketchledge, entitled, "Communication Switching System Employing Gas Tubes," the marking is relayed by sources of alternating current serving as propagators, which diminishes the required direct marking current.

The article by T. Feldman and J. W. Rieke entitled, "Application of Breakdown Devices to Large Multi-Stage Switching," which appeared in the American magazine, "The Bell System Technical Journal," volume XXXVII, November 1958, No. 6, pages 1421 to 1453, describes a system known as an internal marking system which essentially consists of analyzing the address of the lines to be connected in such a manner as to permit to remain in the marking fan-out only the junctions for which there exists the possibility of entering into a physically realisable path between the two lines to be connected. This reduction of the number of fan-out marking branches is obtained by applying marking potentials not only to the ends of the switching network to be connected by a path but also to suitable chosen groups of intermediate junctions.

However, such systems can only be used, in the present state of the art, with cold cathode gas-filled diodes capable of passing a marking current of very small value, about ten times less than their nominal current, without causing very large variations of the operational voltage at their terminals. It would not be possible to achieve such large current variations with p-n-p-n semi-conductor diodes for example, since the value of the current at which the semi-conductor network can be considered as unblocked, that is to say having at its terminals a voltage close to the operational voltage, is rather close to the nominal current value.

Switching networks are also known in which, a memory element being associated with each of the junctions to characterize its condition of service, the selection of an available path is effected before the marking, but these switching networks are only with difficulty extended to a large number of subscribers' lines and switching stages. In addition, the system in which there is a memory element for each junction is very burdensome and also these switching networks require a systematic interconnection of various switching stages, resulting in poor utilisation of the necessary crosspoints.

The logical units which control the switching network can be divided into two parts:

A computer of known type utilizing a simple address instruction code as, for example, the computer of Cambridge University known as EDSAC and described in "Automatic Digital Computers," by M. V. Wilkes, published by Methuen & Co. Ltd., London, which receives in binary form from a suitable scanning device, data relating to the service condition of the telephone lines connected to the switching network and which determines from this the connection and disconnection orders of the said telephone lines;

A second part known as "switching logic" which receives the above-mentioned orders, collects the data relating to the service condition of the various elements of the switching network and determines from this the crosspoints to be controlled to ensure the execution of the orders emanating from the computer to which it returns an answer-back signal.

The switching network according to the invention is constituted by a connection network and a switching logic of the kind defined above.

One general object of the invention is to permit the construction of a space-division electronic switching network of simple control, of high yield and of limited requirements with regard to the performance of its crosspoints and of easy maintenance.

It is an object of the invention to permit the construction of a space-division electronic switching network, the marking of which is controlled by means of a very limited number of instructions obtained from a numerical computer receiving from a scanning device its instructions relating to the service conditions of telephonic lines and circuits connected to this network.

One feature of the switching network according to the invention is that it comprises a connection network and a logical unit known as "switching logic" capable of causing the connection network to carry out the operations instructed by the computer.

Another object of the invention is to enable to be constructed with the least possible number of crosspoints a connection network capable of establishing a given number of simultaneous communications.

A feature of the connection network according to the invention is that the crosspoints being grouped in rectangular matrices divided into a number of stages connected by elementary single-wire junctions, the number of stages, the dimensions of the matrices of each stage and the number of parallel elementary junctions between matrices of adjacent stages, are determined without restriction according to the calculations of optimum distribution of traffic.

Another object of the invention is to enable to be ascertained each possibility of a path capable of connecting any two given telephonic lines or circuits connected to the connection network and to effect the choice of such a path in a single step without the previous establishment of one or several partial paths.

A characteristic of the switching network of the invention is that the choice of a path capable of connecting any two given telephonic lines or circuits connected to this network is effected according to the principle of the conjugate selection extended to all the stages of the switching units by means of a methodic test of each elementary junction which can enter into the composition of such a path. This feature permits, in particular, the choice of paths to be made in such a manner as to facilitate the grading of communications and to rationalize the utilisation of crosspoints.

Another object of the invention is to enable the use, for the switching function, of crosspoints constituted by any known type of two-terminal element having a current-voltage characteristic of the type possessed by cold cathode gas-filled diodes or p-n-p-n semi-conductor elements, for example.

A feature of the switching network according to the invention is that, the choice of the path preceding the marking, the latter is only concerned with the junctions which must effectively participate in the establishment of the said path and the connection elements have, in the conductive condition, two operational conditions, one being the nominal current condition during the connection and the other being the double value current condition during marking.

Another object of the invention is to provide at each connection operation a systematic test checking the correct operation of the network and ensuring, without restriction, that when this test is positive the transmission of audio frequencies will be correct.

A feature of the switching network according to the invention is that the methodic test and the systematic checking test effected on the utilised junctions are concerned with the presence or absence of the direct current on which the audio frequency modulation is imposed.

Another object of the invention is to provide complete identification of the defective crosspoint responsible for the negative result of a systematic checking test.

It is a feature of the switching network according to the invention that it comprises a common member for recording the identity of elementary junctions, known as a "marking register" which operates in synchronism with the methodic test operations and stores the data necessary for the identification of the chain of junctions constituting a chosen path. The marking register is also used to ensure the connection or disconnection operations of the chosen path and the verification of these operations.

Another feature of the switching network according to the invention is that with each stage of junctions there is associated a marking selector or marker applying during the marking operation a marking potential to a group junctions of the stage in question comprising that for which the identity is recorded in the marking register in such a manner as to bring into operation by bilateral marking the only crosspoints corresponding to the selected chain of junctions.

Another object of the invention is to allow the control of the disconnection operations of a chain of junctions which connect through the connection network two given telephonic lines or circuits with the knowledge of the identity of one only of the telephonic lines or circuits to be disconnected.

A feature of the switching network according to the invention is that it comprises the means of identifying the unknown correspondent and the various junctions utilised to form the path connecting the said unknown correspondent to a telephonic line or circuit to be disconnected, and the means for transferring these items of data into the marking register.

Another object of the invention is to provide at each disconnection operation a systematic test verifying the availability of the junctions which have served for the establishment of the disconnected path and to provide, when the result of this test is negative, the complete identification of the defective crosspoint to which this result must be attributed.

Another object of the invention is to allow, in addition to the checks during operation, a simple periodic check of the condition of all crosspoints of the network by a cyclic connection-disconnection trial of all possible paths.

One particular form of the invention in which the connection network is composed of two parts which are symmetrical with respect to a stage of junctions known as median junctions so that one of the parts is connected to the incoming lines or circuits and the other to the outgoing lines or circuits is described in the following with reference to the accompanying drawings, in which.

Figure 1:
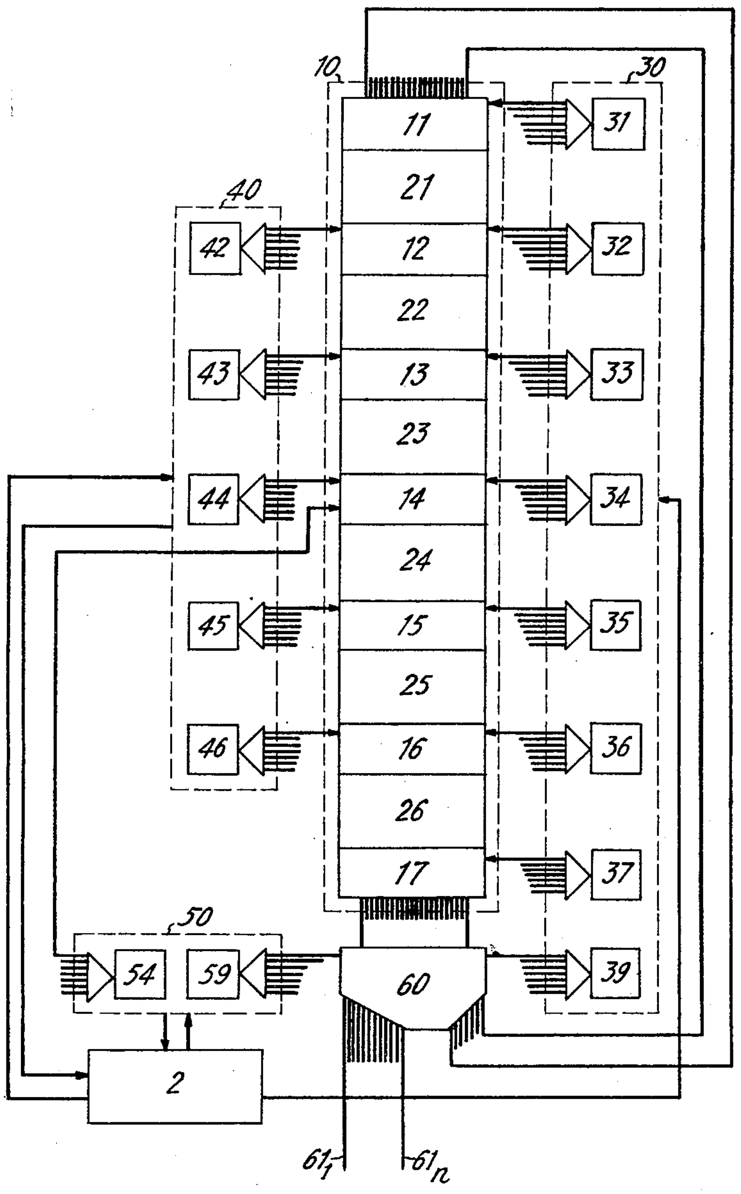
FIGURE 1 is a block diagram of the switching network of the invention.
Figure 12:
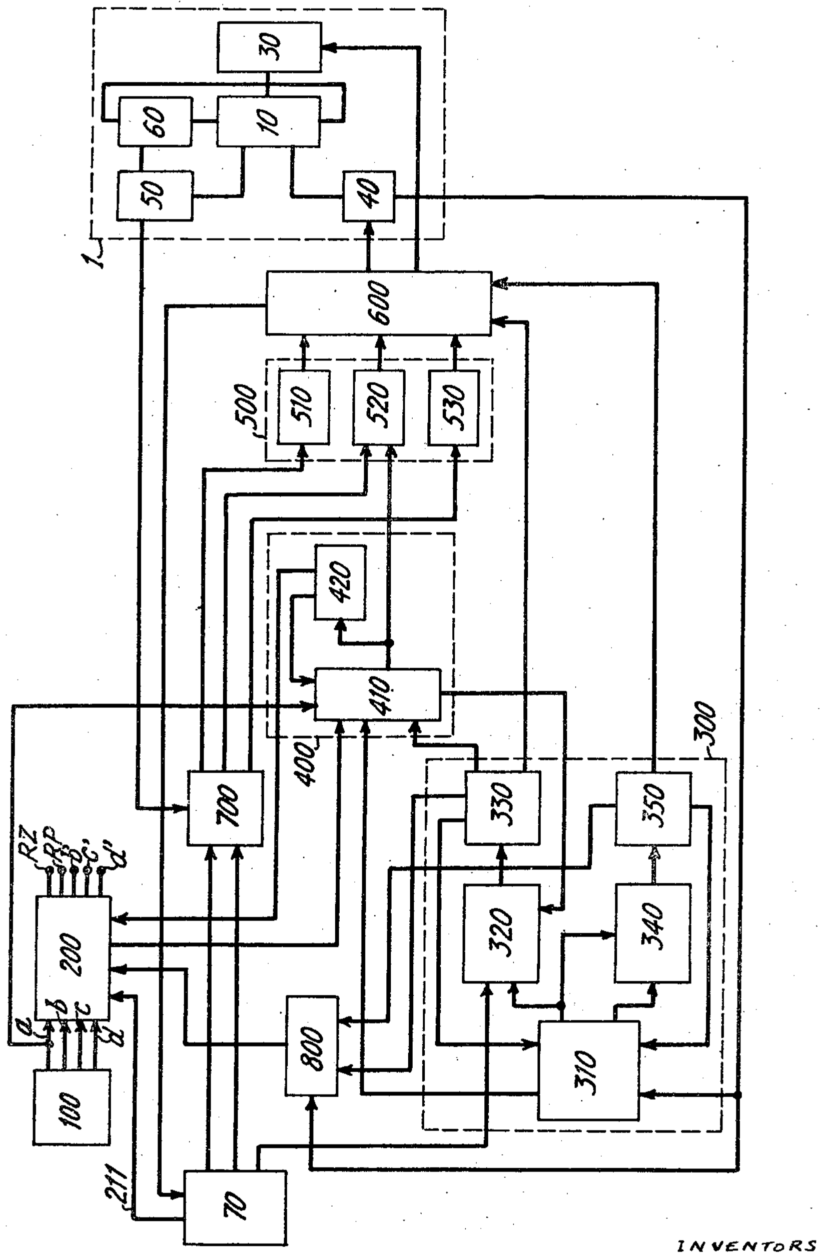
FIGURE 12 is a block diagram of the switching logic of the switching network shown in FIGURE 1.

The switching network consists of the connection network of which the block diagram is shown in FIGURE 1, and the assembly of the logical circuits constituting the switching logic, represented in FIGURE 1 by the block 2 and shown diagrammatically by FIGURE 12.

The connection network comprises: a grading network 10; a group of line equipments 60; a group of marking selectors 30; a group of junction testers 40; a group of identification units 50.

The grading network 10 comprises, by way of example: six stages 21 to 26 of matrices of crosspoints; two stages of end junctions 11 and 17; four stages of intermediate junctions 12, 13, 15 and 16; one stage of median junctions 14.

It should be understood that this example is in no way limiting either in the number of stages and their composition or in the dimensions and connections of their elements.

The group of line equipments 60 comprises as many line equipments as there are telephonic lines or circuits $61_1$ to $61_n$ terminating at the connection network. These lines or circuits can be either subscribers' lines or telephonic circuits coming from or going to other automatic switching units, or concentrator lines coming from concentrators connected to the connection network, or finally special lines or circuits, either outgoing or incoming.

The line equipment of each of these special lines or circuits is connected to one only of the groups of end junctions 11 or 17. The line equipment of each of the other circuits or lines is connected to the two groups of end junctions 11 and 17, thereby allowing their interconnection through the grading network 10.

The group 30 of marking selectors is controlled by the switching logic 2 and comprises: a line equipment marking selector 39 having access to each of the line equipments of the group 60; two end junction marking selectors 31 and 37 having access to each of the junctions of the groups 11 and 17 respectively; four intermediate junction marking selectors 32, 33, 35 and 36 having access to each of the junctions of the groups 12, 13, 15 and 16 respectively; one median junction marking selector 34 having access to each of the junctions of the group 14.

These marking selectors are intended to apply to the junctions designated by the switching logic 2 suitable potentials to cause, according to requirements, the breakdown or extinction of the crosspoints which correspond, in the various stages of the matrix, to a given path.

The unit 40 is in bilateral connection with the switching logic 2. It comprises five junction testers 42 to 46 constituting independent groups having access to each of the junctions of the groups 12 to 16 respectively to detect whether the junctions designated by the switching logic are free or engaged, that is to say whether the crosspoints of the adjacent matrices to which they are connected are all extinguished or whether on the contrary one of them is in operation in each of these matrices.

The group 50 of identification units is in two-way connection with the switching logic 2. It comprises: a median junction identification unit 54 having access to each of the junctions of the group 14; a line equipment identification unit 59 having access to each of the line equipments of the group 60.

The identification units 54 and 59 serve to identify respectively the median junction associated with a path to one end of which a disconnection order has been applied, and the second end of this path in order to permit the disconnection to be effected.

Figure 2:
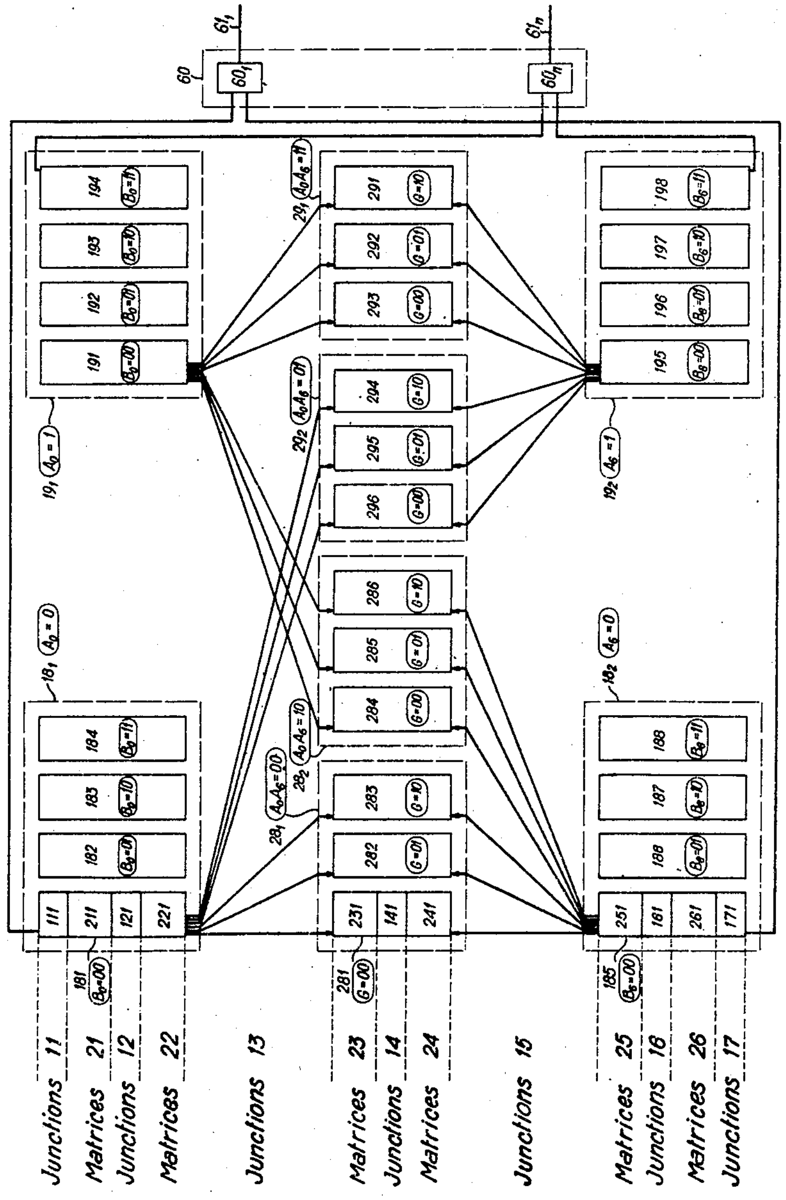
FIGURE 2 shows diagrammatically the grading or distribution network of the switching network of FIGURE 1.
Figure 3:
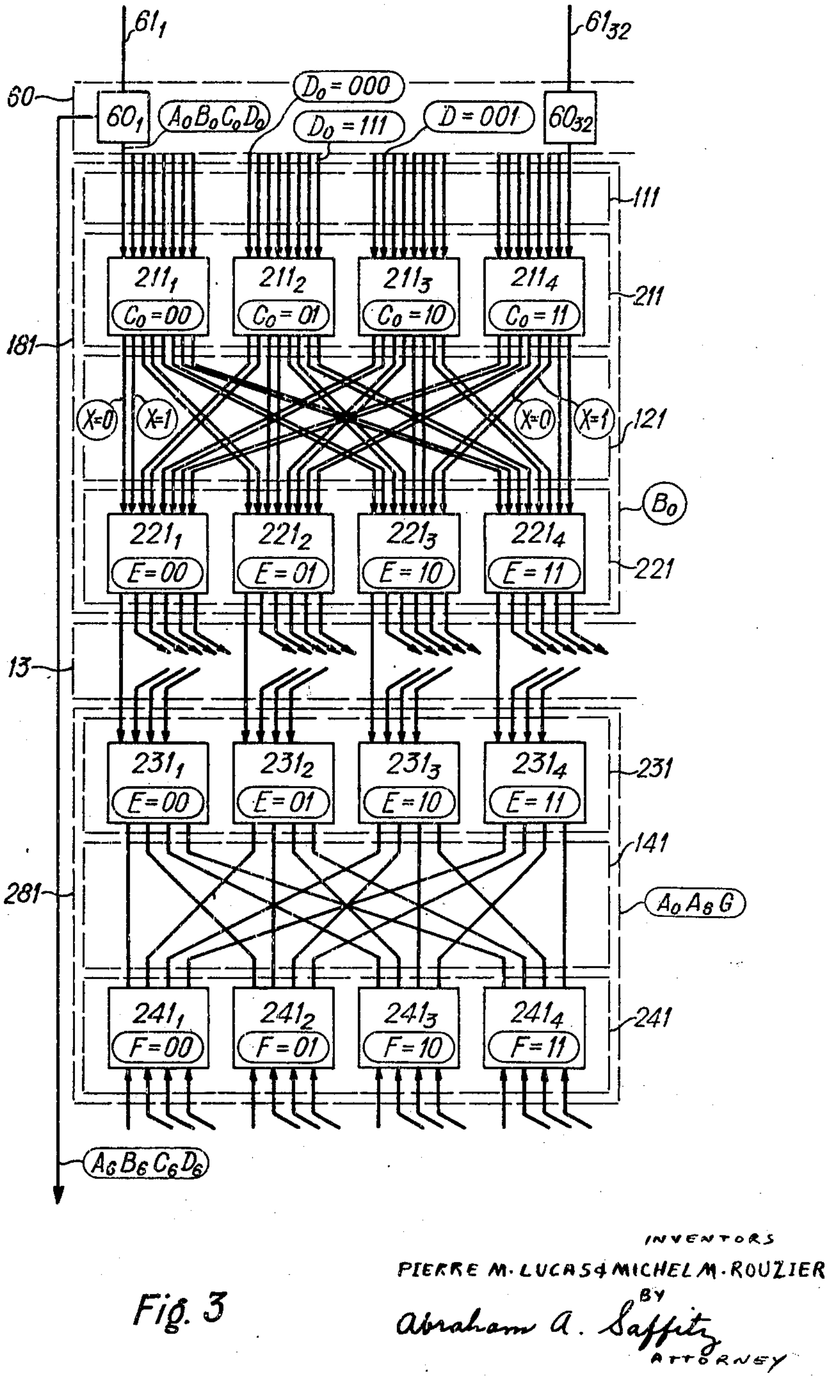
FIGURE 3 shows diagrammatically some details of a fraction of the grading network of FIGURE 2.

FIGURE 2 shows an example of an operational assembly of a grading unit 10 such as that shown diagrammatically in FIGURE 1, and FIGURE 3 provides details for one part of this grading network.

The crosspoint matrices utilised are the standard rectangular matrices with $m$ rows and $n$ columns, known respectively as inputs and outputs of the matrix, of which the crosspoints are constituted by two-terminal crosspoint devices having two stable states, one of them known as "blocked" and the other as "conducting" or "unblocked," such as cold cathode gas-filled tubes or semiconductor elements of the p-n-p-n kind.

When a crosspoint arranged between an incoming junction, that is to say terminating at an input of the matrix, and an outgoing junction, that is to say terminating at an output of the matrix, is in the unblocked state, it is said that the two junctions are connected through the matrix.

The matrix stage 21 comprises 32 matrices such as $211_1$, each with 8 inputs and 8 outputs, of which the 256 inputs are individually connected through incoming junctions 11 to as many line equipments $60_1$ to $60_n$ of the group 60 connected on the other hand through junctions 17 to 256 inputs of the matrix stage 26, except in the case of the special line equipments at the input or at the output. The matrix stage 22 comprises 32 matrices such as $221_1$, each with 8 inputs and 6 outputs. The matrices of the stages 21 and 22 are grouped in fours by means of a certain number of single-wire junctions as shown in FIGURE 3 for the matrices $211_1$ to $211_4$ and $221_1$ to $221_4$, the group of which constituted, with the fraction 111 of the incoming junctions 11 and the fraction 121 of the intermediate junctions 12, a "grading group of selection elements" 181. Each of the incoming junctions 111 connects one of the 32 line equipments $60_1$ to $60_{32}$ of the group 60 to one of the 32 inputs of the matrices $211_1$ to $211_4$. The 32 single-wire junctions 121 connect the outputs of the matrices $211_1$ to $211_4$ to the inputs of the matrices $221_1$ to $221_4$ so that each of the matrices $211_1$ to $211_4$ is connected to each of the matrices $221_1$ to $221_4$ through two electrically independent parallel junctions. As shown in FIGURE 2 four grading groups 181 to 184 form a half selection element $18_1$. Symmetrically with respect to the median junctions 14, junctions 17 are connected to the inputs of the matrices of the stage 26 and the outputs of these latter are connected to the inputs of the matrices of the stage 25 by the junction 16; four grading groups 185 to 188 similar to the grading groups 181 to 184, constitute a half selection element $18_2$ which forms, with the half element $18_1$, the selection element 18. This latter comprises half of each of the junction stages 11, 12 and 17, 16 and the matrix stages 21, 22 and 26, 25. In the same way, the second half of the junction stages 11 and 12 and the matrix stages 21 and 22 constitutes a half section element $19_1$ comprising four grading groups 191 to 194 and the second half of the junction stages 17 and 16 and the matrix stages 26 and 25 constitutes a half selection element $19_2$ comprising four grading groups 195 to 198. The assembly of half selection elements $19_1$ and $19_2$ forms the selection element 19. The matrix stages 23 and 24 each comprise 48 matrices such as $231_1$ with four inputs and four outputs. The matrices of these stages are linked together in fours by means of single-wire junctions as is shown in FIGURE 3 for the matrices $231_1$ to $231_4$ and $241_1$ and $241_4$, which together constitute, with the fraction 141 of the median junctions 14, a "grading group of grading elements" 281. The outputs of the matrices $231_1$ to $231_4$ and $241_1$ to $241_4$ are interconnected by the 16 median junctions 141 in such a way that each of the matrices $231_1$ to $231_4$ are connected to each of the matrices $241_1$ to $241_4$ by a single-wire junction. Three grading groups of grading elements such as 281 form a "grading element." There are thus four grading elements $28_1$, $28_2$, $29_1$, $29_2$ respectively constituted by grading groups of grading elements 281 to 283, 284 to 286, 291 to 293 and 294 to 296.

The inputs of the matrices of the stage 23 are connected to outputs of the matrices of the stage 22 by the intermediate junctions 13 and the inputs of the matrices of the stage 24 are connected to the outputs of the matrices of the stage 25 by the intermediate junctions 15 in such a way as to effect between the grading elements and the half selection elements, the following relationships: the grading elements $28_1$ connects together the three first outputs of the matrices of the half selection elements $18_1$ and $18_2$; the grading element $28_2$ connects the three first outputs of the matrices of the half selection element $19_1$ to the three last outputs of the matrices of the half selection element $18_2$; the grading element $29_2$ connects the three last outputs of the matrices of the half selection element $18_1$ to the three first outputs of the matrices of the half selection element $19_2$; the grading element $29_1$ connects together the three last outputs of the matrices of the half selection elements $19_1$ and $19_2$.

The grading between a half selection element such as $18_1$ and a grading element such as $28_1$ is a standard grading between the matrices of given order of the different grading groups 181 to 184 and the matrices of the same order of the different grading groups 281 to 283. A path is thus defined by the end junctions of the stages 11 and 17 which it connects, by the median junction which is used and by the number of each of the junctions of stages 21 and 26 used in its pair of parallel junctions. The designation of a path by the logical switching device is therefore reduced to that of the parameters characteristic of the above elements. These parameters, which are expressed in binary form according to the following conventions are shown in FIGURES 2 and 3, where they are circled by a full line, adjacent the reference numerals of the member which they characterize.

The half selection elements $18_1$ and $19_1$ are designated by a number $A_0$ capable of taking two values 0 and 1.

The four grading groups such as 181 of each of the half selection elements $18_1$ and $19_1$ are designated by a number $B_0$ capable of taking four values 00, 01, 10, 11.

The four matrices of the stage 21 relating to a grading group such as 181 are designated by a number $C_0$ capable of taking four values 00, 01, 10, 11. The eight incoming junctions of the stage 11 relating to a single matrix of the stage 21 are designated by a number $D_0$ capable of taking eight values 000, 001, 010, 011, 100, 101, 110, 111.

Symmetrically, the half selection elements $18_2$ and $19_2$ are designated by a number $A_6$, the grading groups such as 185 by a number $B_6$, the matrices of the stage 26 by a number $C_6$ and the inputs of these matrices by a number $D_6$.

The four grading elements such as 281 are designated by a number $A_0A_6$ capable of taking four values, which is obtained by combining the numbers $A_0$ and $A_6$ relative to the two half selection elements such as $18_1$ and $18_2$ interconnected by the said grading element. The three grading groups such as $28_1$ are designated by a number G capable of taking three values 00, 01, 10.

In each grading group such as 281, the four matrices such as $231_1$ of the stage 23 are indicated by a letter E and the four matrices such as $241_1$ of the stage 24 are designated by a letter F which, like the letter E, can have four values 00, 01, 10 and 11.

In addition, the connections between matrices of stage 21 and matrices of the stage 22, like the connections between matrices of stages 26 and 25, being double, the number of the utilised junction of stage 12, in the pair of parallel junctions to which it belongs, is defined by a letter X which can have two values 0 and 1 and the numeral of the junction of stage 16 in its pair is defined by a letter Y which can also have two values 0 and 1.

Thus, an end junction of stage 11 is defined by:

$A_0$=the number of the half selection element such as $18_1$;

$B_0$=the number of the grading group such as 181 in the half selection element;

$C_0$=the number of the matrix such as $211_1$ of stage 21 in the grading group;

$D_0$=the number of the incoming junction in the matrix.

In the same way, an end junction of the stage 17 is defined by $A_6B_6C_6D_6$ with the same meanings.

A median junction is defined by:

$A_0A_6$=the number of the grading element such as $28_1$;

$G$=the number of the grading group such as 281 in the grading element;

$E$=the number of the matrix such as $231_1$ of stage 23 in the grading group, connected to the junction;

$F$=the number of the matrix such as $241_1$ of stage 24 in the grading group, connected to the junction.

In addition, the double junctions of stages 12 and 16 are defined by:

$X$=parity of the utilised junction of stage 12;

$Y$=parity of the utilised junction of stage 16;

A complete path is wholly defined by the parameters $A_0B_0C_0D_0A_6B_6C_6D_6EFGX$ and Y.

It will be seen from FIGURES 2 and 3 that in accordance with the following table, a junction is defined by the identical parameters of one or other of its ends, that is to say by an input or an output of the matrix and a crosspoint in a matrix is defined by the combined parameters of the input and the output of the matrix which it is capable of connecting.

Junctions 11: $A_0B_0C_0D_0$
Crosspoints of stage 21: $A_0B_0C_0D_0EX$
Junctions 12: $A_0B_0C_0EX$
Crosspoints of stage 22: $A_0B_0C_0A_6GEX$
Junctions 13: $A_0B_0A_6GE$
Crosspoints of stage 23: $A_0A_6B_0GEF$
Junctions 14: $A_0A_6GEF$
Crosspoints of stage 24: $A_6A_0B_6GFE$
Junctions 15: $A_6B_6A_0GF$
Crosspoints of stage 25: $A_6B_6C_6A_0GFY$
Junctions 16: $A_6B_6C_6FY$
Crosspoints of stage 26: $A_6B_6C_6D_6FY$
Junctions 17: $A_6B_6C_6D_6$.

The principles of utilisation of such a grading network are as follows:

(1) PRINCIPLES OF CONNECTION OF A PATH

The connection of a path between a junction $A_0B_0C_0D_0$ and a junction $A_6B_6C_6D_6$ of which the parameters are recorded in the switching logic are effected under its control in three steps, search, connection and verification, at the end of which the parameters which are characteristic of the selected path can be read off externally for the maintenance or establishment of statistics.

The search for a free path takes place in the following manner:

(a) The tester 42 tests successively the junctions of the stage 12 which can be connected to the input $A_0B_0C_0D_0$ of the stage 21, that is to say the junctions coming from the outputs $A_0B_0C_0EX$ in which E and X are the variables, if a junction is free, see paragraph (b) below, if all the junctions are engaged, the end of a test cycle of the possible values of E and X causes the stopping of the unit and indicates the blocking of the network;

(b) The tester 46 tests successively the junctions of the stage 16 which can be connected to the input $A_6B_6C_6D_6$ of the stage 26, that is to say the junctions coming from the outputs $A_6B_6C_6FY$ where F and Y are variables, if a junction is free see paragraph (c) below, if all the junctions are engaged the end of a test cycle causes the stopping of the unit and indicates the blocking of the network;

(c) The three testers 43, 44 and 45 test respectively the junctions of stages 13, 14 and 15 corresponding to the values of E and F defined above, that is to say: stage 13—$A_0B_0A_6GE$; stage 14—$A_0A_6GEF$; stage 15—$A_6B_6A_0GF$; in which G is the common variable, if the three junctions corresponding to a value of G are found to be free, the path is defined and there follows the bringing into operation of the crosspoints, if no value of G is suitable, the end of the test cycle causes: either a return to (b) if the junction 16 previously tested was not the last in the test cycle, or a return to (a) it it were last and if the junction 12 previously tested was not the last of the test cycle, or a stoppage if the junctions 16 and 12 were the last ones in the corresponding test cycles.

It should be noted that: any return to (b) causes the test cycle (c) to be recommenced at the beginning; any return to (a) causes the test cycles (b) and (c) to be recommenced from the beginning; after a back return, the end of the test cycle at (b) causes a return to (a) and not a stoppage.

The bringing of the crosspoints into operation takes place in strictly identical manner and takes place simultaneously on both sides of the median junction. For example, to connect a point $A_0B_0C_0D_0$ to a given median junction $A_0A_6GEF$, the marking selector of the median junctions 34 sends a marking pulse to the output of the stage 23, $A_0A_6GEF$ being thus defined, the marking selector 33 sends a marking pulse to all the inputs of letter $B_0$ of the matrices of stage 23; only the crosspoint $$A_0A_6B_0GEF$$

which receives the two pulses, is brought into operation. The operation of this crosspoint affects the junction $A_0A_6GEB_0$ of stage 13 and therefore the corresponding output of stage 22 in the form of a pulse identical to the marking pulse, called "transfer pulse." The marking selector 32 sends a marking pulse to all the inputs of letter $C_0X$ of the matrices of stage 22; only the crosspoint $A_0B_0C_0A_6GEX$ which receives the two pulses is brought into operation. The operation of this crosspoint affects the junction $A_0B_0C_0EX$ of stage 12, and therefore the corresponding output of matrix 21, in the form of a transfer pulse. The marking selector 31 transmits a marking pulse to all the inputs of letter $D_0$ of the matrices of stage 21; only the crosspoint $A_0B_0C_0D_0EX$ which receives the two pulses is brought into operation. Upon the removal of the markings, the path is normally connected.

The verification of the path is effected by means of the testers already used during the search for a path: they must find all the junctions engaged. The connection operation is then terminated and the data E, F, G, X, Y can be transferred externally.

(2) PRINCIPLES OF DISCONNECTION OF A PATH

The disconnection of a path of which the parameters of only one end are recorded in the switching logic is effected under its control in four steps, disconnection of an identified half path, identification of the second end of the path, disconnection of the second path and verification, at the end of which the parameters characteristic of the disconnected path can be read off externally.

To disconnect the half path terminating at the input $A_0B_0C_0D_0$, the marking selector of the line equipments 39 transmits over this input a pulse which cuts off the current passing in series through the three crosspoints concerned in the stages 21, 22 and 23. The median junction identifier 54 then identifies the median junction where a half path has been disconnected, that is to say $A_0A_6GEF$ ($A_0$ being already known). The median junction marking selector 34 transmits a marking pulse to the junction of the stage 14 thus identified; this pulse is effective in the form of a transfer pulse at the junctions 15, 16 and 17. The end junction identifier 59 then identifies the junction $A_6B_6C_6D_6$ where the transfer pulse terminates.

To disconnect the half path connecting $A_0A_6GEF$ to $A_6B_6C_6D_6$, the line equipment marking selector 39 transmits to this input a pulse which cuts off the current passing in series in the three crosspoint concerned in the stages 26, 25 and 24. The path which connects $A_0B_0C_0D_0$ to $A_6B_6C_6D_6$ through $A_0A_6GEF$ is then disconnected.

The path which has thus been disconnected is known, except the junctions 12 and 16 of which the parity remains undefined, X and Y being unknown. The testers 43, 44 and 45 verify that the junctions of the stages 13, 14 and 15 are free.

It may be noted that the crosspoints are supplied in series from the median junction to the end junction: if a crosspoint is disconnected, the semi-path is disconnected: it is therefore only necessary to test the junctions 13 and 15, one for each semi-path.

The detail of the above operations will be explained by means of a non-limiting example in which the crosspoints used in the grading network are cold-cathode gas-filled tubes.

Figure 4:
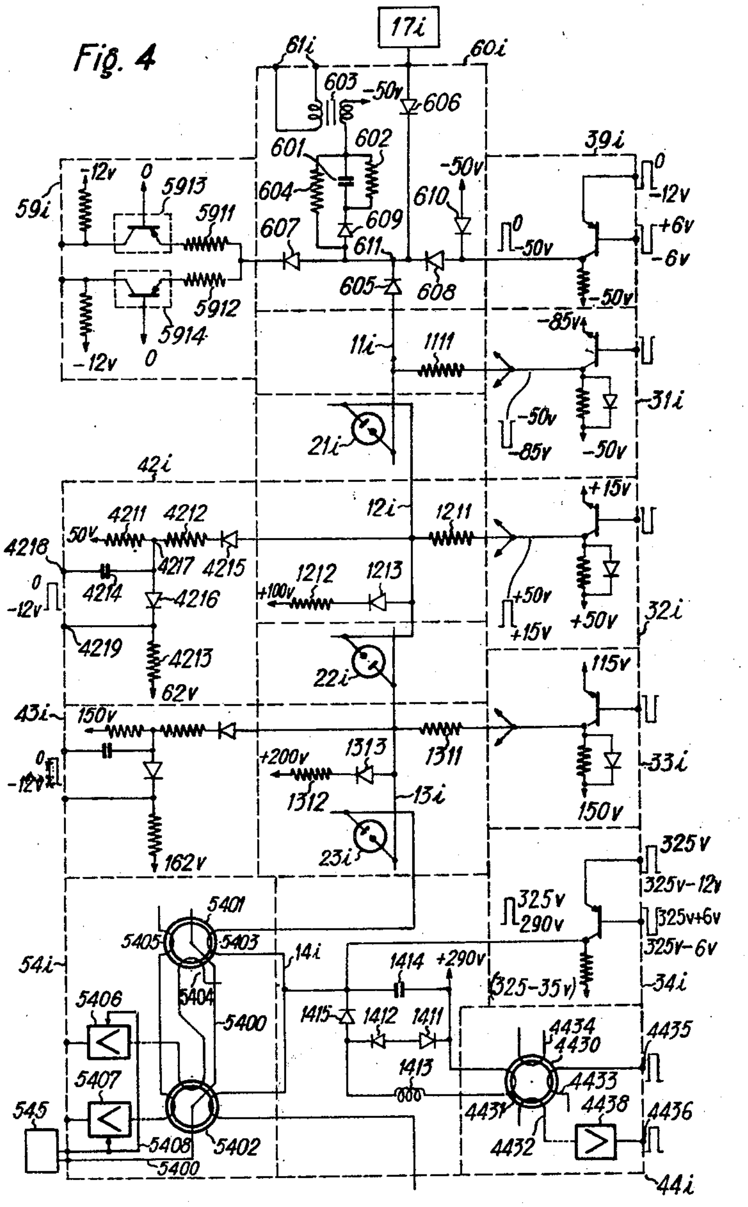
FIGURE 4 is a diagram showing at least in part one single unit of each of the sub-assemblies of one of the symmetrical parts of the connection network of FIGURE 1.

A single member, crosspoint or junction, of each stage of the grading network being required at a given instant and additionally, the operation of the connection network being symmetrical with respect to the stage of median junctions, FIGURE 4 is a limited to the stages constituting a half-path and shows only one unit for each stage. In addition, only the end units of the testers, marking selectors and identifiers, which will be described as a group later, have been shown in this FIGURE 4, in which the reference numerals correspond to those of FIGURES 1 to 3.

A line equipment $60_1$ of a telephonic line or circuit $61_1$ connected to the unit 60 is shown in FIGURE 4. The line equipment $60_1$ connects the line $61_1$ on the one hand to a junction $11_1$ through a diode 605 and on the other hand to a junction $17_1$ of the stage 17 through a diode 606. It represents any one of the line equipments, either an equipment of a subscriber's line, or an equipment of a telephonic circuit coming from or going to other automatic switching units, or an equipment of a concentrator line coming from a concentrator. The special line equipments are different only in that they are connected to only one of the end junction stages 11 or 17. The connection between the line $61_1$ and the point 611, common to the diodes 605 and 606, is made through a transformer 603 connected to a source of potential of —50 volts and through a circuit consisting of two parallel branches, the first constituted by a resistor 604 and the second by a diode 609 in series with a capacitor 601 shunted by a resistor 602. The line equipment $60_1$ is connected on the one hand to the marking selector 39 through a diode 608 the input of which is also connected to a source of potential of —50 volts through a diode 610, and on the other hand to the identifier 59 through a diode 607.

The end junctions of the junction stages 11 and 17 are identical. The marking pulse, common to all the junctions connected to the matrix inputs having a like number, is applied through a resistor such as 1111. The high value of the resistor 1111 (1.8 megohms) limits the current provided by the marking selector 31 and reduces the attenuation introduced by this by-pass on the speech circuit. The wiring of the junctions is generally rather long and presents a capacitance of the order of 100 picofarads with respect to earth. The capacitance lengthens the wavefronts of the marking pulse, with the result that it becomes necessary to apply the pulse to the connection stage 21 before the end of the pulse applied to the connection stage 22, as will be seen later. When gas-filled tube fires, the charging of the stray capacitance mentioned above causes a brief over-voltage which facilitates the firing of gas-filled tubes.

The intermediate junctions are all of the same form. The supply voltages for the junctions 13 and 15 are greater by 100 volts than those of the junctions 12 and 16. The intermediate junctions are each associated with three units. For example, the junction $\mathbf{12}_1$ is connected: to an output element $\mathbf{32}_1$ of the marking selector 32 through a resistor 1211 (1.8 megohms); to a test point $\mathbf{42}_1$ of the intermediate junction tester 42; and to an auxiliary flow device constituted by a resistor 1212 and a diode 1213 and permitting the determination of the intermediate currents during the period in which the gas-filled tubes are fired.

This device represents a very high impedance for the duration of a telephonic conversation, the diode 1213 being then blocked.

The median junctions which connect two by two the outputs of the connection stages 23 and 24 ensure through their middle position the supply of the half-paths which they complete. In series with a source of potential of 290 volts are a test point $\mathbf{44}_1$ of the tester 44 and an inductance 1413 shunted by two Zener diodes 1411 and 1412 in opposition, a diode 1415 and the middle point of the junction $\mathbf{14}_1$ connected to the source of potential of 290 volts by a capacitor 1414. The middle point of the junction $\mathbf{14}_1$ is connected on the one hand to an output element $\mathbf{34}_1$ of the marking selector 34 and on the other hand to two outputs of stages 23 and 24 and passes at $\mathbf{54}_1$ through two symmetrical test points 5411 and 5412 of the median junction identifier 54.

During the marking, the diode 1415 of the median junction $\mathbf{14}_1$ isolates the inductance 1413. At the end of the marking, the capacitor 1414 supplies, for a brief instant, a discharge current to the gas-filled tubes and then the regulating Zener diode 1411 limits the excess voltage produced by the inductance 1413. The regulating Zener diode 1412 limits the positive excess voltage produced by the inductance 1413 at the moment of the disconnection operation. During a telephone conversation, the unit consisting of the inductance 1413 and the capacitance 1414 presents an impedance which is enough not to attenuate too much the speech frequency currents: the capacitance 1414 additionally enables the correction of the equivalent-frequency curve.

(1) CONNECTION OF A PATH

A. *Connection.*—In the rest condition, the junctions of stages 14, 13, 12 and 11 are respectively at potentials of 290, 150, 50 and −50 volts: the gas-filled diodes of the connection stages 23, 22 and 21, which are respectively subjected to a potential difference of 140, 100 and 100 volts, do not fire.

To connect a previously selected path terminating at a line $\mathbf{61}_1$ the following events take place simultaneously and for a period of about 1 millisecond the median junction marking selector 34 raises the selected median junction $\mathbf{41}_1$ to 325 volts; the marking and switching selectors 33, 32 and 31 respectively raise the potentials of the selected junctions $\mathbf{13}_1$, $\mathbf{12}_1$ and $\mathbf{11}_1$ to 115, 15 and −85 volts.

The gas-filled tube $\mathbf{23}_1$, now subjected to a potential of 210 volts, fires and causes a current flow in the junction $\mathbf{13}_1$: through a resistor 1311 (1.8 megohms) associated with the selector 33; through a diode 1313 in series with a resistor 1312 which is connected to the 200-volt supply.

The resistor 1312 permits the passage of a current of about 7 milliamps. The voltage at the terminals of the gas-filled tube $\mathbf{23}_1$ then being about 100 volts, the junction $\mathbf{13}_1$ is raised to 225 volts. This change of potential, called a transfer pulse, subjects the gas-filled tube $\mathbf{22}_1$ to a voltage of 210 volts. The tube $\mathbf{22}_1$ fires and causes a current to flow in the junction $\mathbf{12}_1$: through a resistor 1211 (1.8 megohms) connected to the selector 32; through a diode 1213 in series with a resistor 1212 connected to a 100-volt supply.

The resistor 1212 permits the passage of a current of about 7 milliamps. A current of about 14 milliamps passes through the gas-filled tube $\mathbf{23}_1$, but the voltage at its terminals is substantially unchanged.

The gas-filled tube $\mathbf{22}_1$, passing a current of 7 milliamps has a potential of 100 volts at its terminals: in the same way, the junction $\mathbf{12}_1$ is raised to 125 volts and supplies to the gas-filled tube $\mathbf{21}_1$ a transfer pulse which subjects it to a voltage of 210 volts. The tube $\mathbf{21}_1$ fires and causes a relatively large current to flow through the line equipment 60 to charge the capacitor 601 (0.47 microfarad).

As a result, the currents in the gas-filled tubes $\mathbf{22}_1$ and $\mathbf{23}_1$ increase and consequently the voltage at their terminals is slightly greater than 100 volts: the potential of the junctions is thus reduced with respect to its previous value at the time of firing of the gas-filled tube $\mathbf{21}_1$. This change is of no consequence, all the gas-filled tubes being fired.

At the end of the marking operations, the current in the median junction equipment $\mathbf{14}_1$ passes firstly through Zener diodes 1411 and 1412, then through the inductance 1413. The junctions $\mathbf{14}_1$, $\mathbf{13}_1$, $\mathbf{12}_1$, and $\mathbf{11}_1$ are then respectively at 290, 190, 90 and −10 volts. The diodes 1313 and 1213 are blocked. The main current (11 milliamps) therefore flows through the inductance 1413, the three gas-filled tubes $\mathbf{23}_1$, $\mathbf{22}_1$ and $\mathbf{21}_1$, the resistor 602 and the input transformer 603 of the line $\mathbf{61}_1$. Only the 1.8 megohm resistors 1311, 1211 and 1111 of the junctions $\mathbf{13}_1$, $\mathbf{12}_1$ and $\mathbf{11}_1$ constitute shunt paths and these are practically negligible.

During this time, the gas-filled tubes of the stages 24, 25 and 26 are fired in a similar manner. At the end of the marking operations, the telephone currents pass through the transformer 603, the six gas-filled tubes of the stages $\mathbf{21}_1$ to $\mathbf{26}_1$ and the transformer associated with the other line to be connected (not shown on FIGURE 4); the inductance 1413 constitutes a negligible by-pass for the telephonic current.

It has already been explained that the marking is not applied to a single selected point, but to a large number of points certain of which may correspond to paths which are already used for speech. As a consequence there is a variation in the small by-pass current passing through the resistors of 1.8 megohms, and a noise on the "speech" chain which is not completely negligible. To reduce these noises, the marking operations are in practice effected in the following manner: the marking of the median junction 14 lasts for about 1 millisecond; the marking of the junctions 13 and 15 commences at the same moment but lasts only 300 microseconds—the tubes of stages 23 and 24 fire during this marking; the marking of the projections 12 and 16 starts a little before the end of the preceding operation and lasts 300 microseconds, the tubes of stages 22 and 25 firing during this marking operation; the marking of the junctions 11 and 17 starts a little before the end of the preceding operation and lasts 300 microseconds, the tubes of stages 21 and 26 firing during this marking operation.

Figure 5:
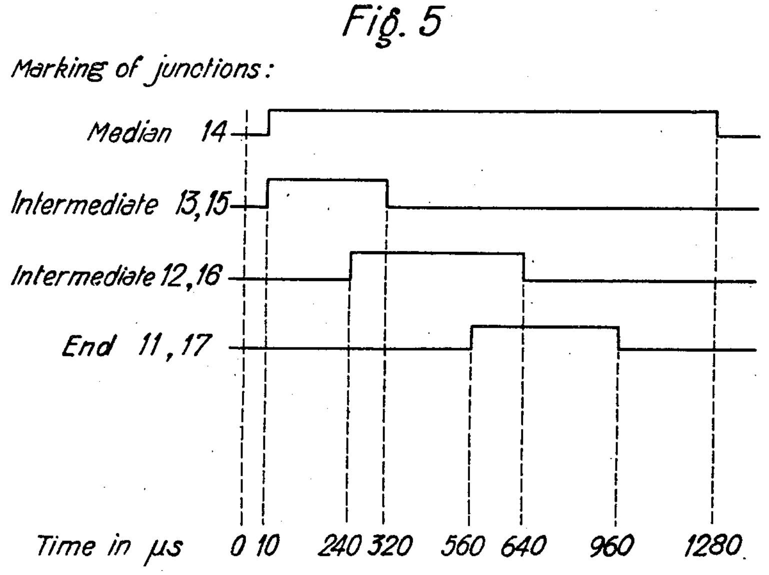
FIGURE 5 is a diagram showing the marking times of the junctions.

The exact timing diagrams are shown in FIGURE 5.

The different voltages which are present in the network during the connection are summarized in the following table:

| | Junction 11 or 17, volts | Juuction 12 or 16, volts | Junction 13 or 15, volts | Junction 14, volts |
|---|---|---|---|---|
| Idle | −50 | 50 | 150 | 290 |
| Marking | −85 | 15 | 115 | 325 |
| Transfer | 25 | 125 | 225 | 325 |
| Speech | −10 | 90 | 190 | 290 |

During the marking of a junction 11 connected to a line equipment 60, the diode 605 isolates the remainder of the line equipment 60 and therefore the junction 17. After the connection of the gas-filled tube of stage 21, the current passing through the tube charges the capacitor 601 and flows through the resistors 602 and 604, the transformer 603 and the −50 volt supply; the diode 606 isolates the junction 17; the diode 608 protects the marking selector 39 against the positive voltage of the transfer pulse which actuates the identifier 59 through the diode 607. At the end of the transfer pulse, that is to say at the end of the marking of the median junction 114, the capacitor 601 is charged to +25 volts, the point 611 is at −10 volts; as a consequence, the diode 609 is blocked and the capacitor 601 discharges itself through the resistor 602. The current which passes through the resistor 604 towards the transformer 603 and the −50 volt supply line is sufficient to maintain in their conducting condition the gas-filled tubes of the connected half-path. When the discharge of the capacitor 601 is completed, the diode 609 is unblocked and the current from the gas-filled diodes to the −50 volt supply line passes through the resistors 602 and 604 the values of which are chosen to ensure that this current is of 11 milliamps.

The path which has been established for the telephonic speech currents is as follows: the capacitor 601 decouples the resistor 604; the diode 609, polarized by the current passing through the resistor 602, allows the passage of the telephone currents; the line transformer 603 converts the symmetrical connection of the telephone line into an unsymmetrical connection, its secondary providing the return path for the current of the gas-filled diodes towards the −50 volt supply line.

Experience shows that with this arrangement taking into account the tolerances, a tube cannot fire either if it receives a single transfer or marking pulse or if it terminates at a connected path.

TESTING THE PATHS

It has been stated above that the testers have for their purpose to distinguish between the free junction and the engaged junctions (the testers never operate on junctions on which there is a marking or transfer pulse).

The test points $42_i$ and $43_i$ of the intermediate junctions 12 and 13 shown on FIGURE 4 and those of the intermediate junctions 15 and 16 have the same structure. The test point $42_i$ of the tester 42, for example, comprises an input 4218 connected through a capacitor 4214 on the one hand through a resistor 4211 to a source of potential of +50 volts and through a resistor 4212 and a diode 4215 to the junction $12_i$, and on the other hand through a diode 4216 to an output 4219 and to a resistor 4213 connected to a source of potential of +62 volts.

In the rest condition, the junction $12_i$ and consequently the point 4217 common to the two resistors 4211 and 4212, the capacitor 4214 and the diode 4216, are at a potential of 50 volts. If a pulse of 12 volts amplitude and of 1.25 microseconds' duration is transmitted to the input 4218 of the test point $42_i$, the point 4217 changes from the 50 volt potential to the potential of 62 volts and the output 4219 remains at the potential of 62 volts. On the contrary, if a connected path passes through the junction $12_i$, the latter is at the potential of 90 volts, the point 4217 which is then at a potential in the region of 62 volts changes to a potential of 74 volts and, the diode 4216 being unblocked, the output 4219 follows the potential of the point 4217. Thus the application of a test pulse to the input 4218 of the test point $42_i$ gives rise to a pulse at its output 4219 in the case when the associated junction $12_i$ is engaged.

A test point such as $44_i$ of the median junction tester 44 is constituted by a magnetic toroid 4430 comprising four windings 4431, 4432, 4433, 4434. The winding 4431, known as the polarizing winding, is in series with the inductance 1413 associated with the junction $14_i$. It has been seen that the potential of this latter is 290 volts both in the idle condition and in the speech condition and that the principal currents of 11 milliamps of the two half-paths comprising the median junction $14_i$ add in the inductance 1413 which thus has flowing through it a zero current in the idle condition and a current of 22 milliamps saturating the toroid 4430 during the connection.

To test the toroid 4430, a saturating pulse is applied to it by means of the winding 4434 and then a test pulse of inverse polarity is applied through an input 4435 to the winding 4433. If the junction $14_i$ is free, the test pulse causes the toroid 4430 to swing over, thereby supply a read pulse through the winding 4432 to an amplifier 4438 and to an output terminal 4436. If, on the contrary, the junction $14_i$ is engaged, the current of 22 milliamps which flows through the winding 4431 maintains the toroid in its saturation state and no read pulse appears at the output 4436.

Thus, contrary to the intermediate junction test points, the application of a test pulse at the input 4435 of the median junction test point $44_i$ gives rise to an output pulse in the case in which the associated junction $14_i$ is free.

(2) DISCONNECTION OF A PATH

A. *Disconnection of a half-path.*—To disconnect a half-path connected to a line equipment $60_i$, the marking selector 39 of the line equipment applies earth potential to the line equipment $60_i$. The diode 605 or 606 blocks, and the gas-filled tubes extinguish owing to the fact that they cannot maintain themselves conducting through the intermediary of the resistors of 1.8 megohms such as 1111, 1211, 1321, etc.

B. *Identification of the median junctions.*—Each median junction such as $14_i$, comprises two identical identification points situated one on each side of the inductance 1413 connecting the junction $14_i$ to the supply line of +290 volts, each of which corresponds to a half-path.

At end unit such as $54_i$ of the median junction identification unit 54 comprises essentially a magnetic toroid 5401 for a first half-path and another 5402 for a second half-path.

The polarizing winding 5403 in series with the first half-path for example saturates the toroid if the half-path in question is connected. Before the marking of the line equipment 60 for disconnection, a zero-restoring pulse is transmitted through a wire 5400 to all the toroids. At the end of this pulse the toroids corresponding to a connected half-path are maintained in a state of saturation and the others are in a zero state.

After the disconnection, an order pulse identical with the zero-restoring pulse is sent to all the toroids. The toroid corresponding to the disconnected half-path then swings over and supplies to two identical output windings 5404 and 5405 of the toroid 5401 two read pulses which are then utilised in the identification unit 54 to code the number of the median junction $14_i$.

C. *Identification of the line equipments.*—A terminal unit such as $59_i$ of the line equipment identification unit 59 is an amplifier having two outputs and consisting of two p-n-p transistors in parallel having their bases connected to earth. It has been seen that an end junction such as $11_i$ connected to a median junction $14_i$ assumes a positive potential when this junction is marked by the marking selector 34 and only in this case. This potential is transmitted through the diodes 605 and 607 to the line equipment identification unit 59, where it is used to code the number of the line equipment $60_i$.

Upon disconnection, the marking selector 39 of which the end unit $39_i$ is a base-controlled p-n-p transistor, places the point 611 at earth potential. A current passes through the resistors 602 and 604 and the transformer 603. The diode 605 or 606 blocks and the half-path becomes disconnected. At the end of the marking, all the currents are cut off; the diode 610 then limits the negative excess voltage due to the inductance of the secondary winding of the line transformer 603 on the transistor of the line equipment marking selector.

*Marking selectors*

The marking selectors comprise an address register consisting of trigger circuits conditioned by the switching logic as a function of the parameters which are characteristic of the unit or of the group of units to be marked, a decoder or two stages of decoders connected by an intermediate stage according to the capacity of the address register and a final stage comprising as many end units grouped in a matrix as there are units or groups of units to be marked.

Figure 6:
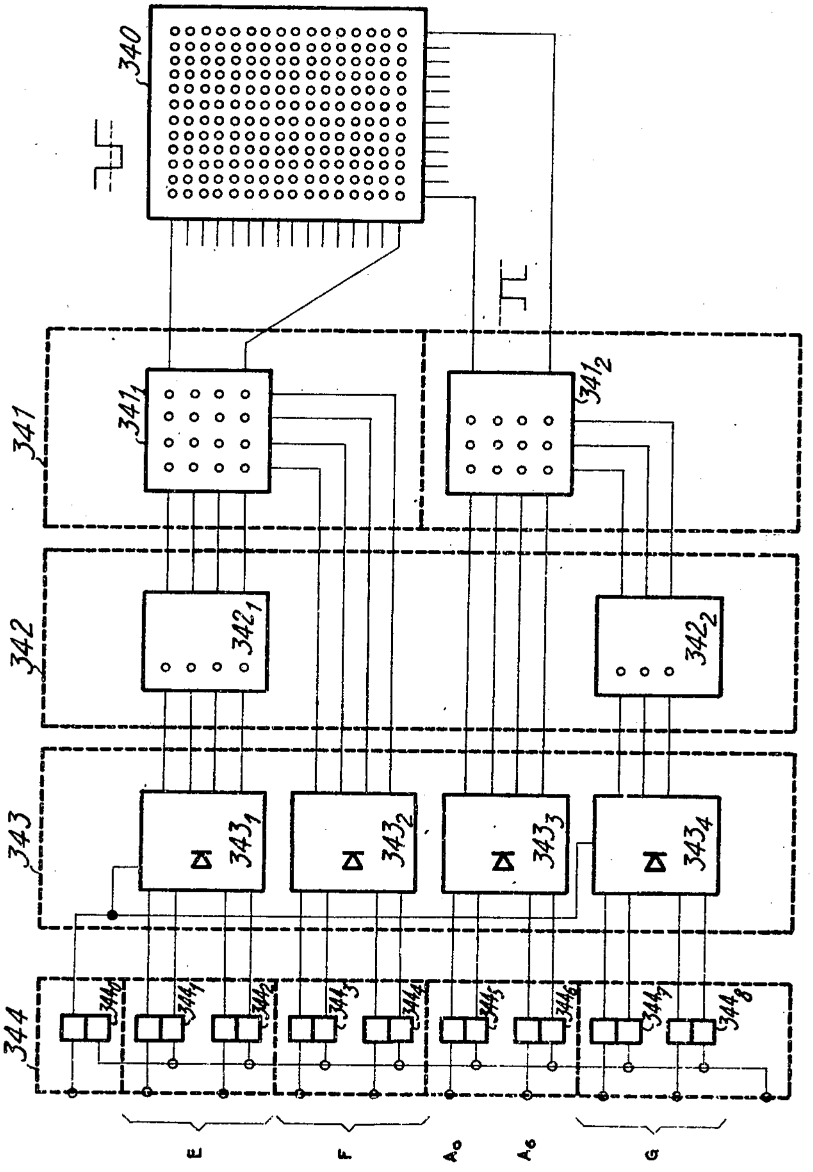
FIGURE 6 is a diagram of a marking selector for median junctions.

FIGURE 6 is a circuit diagram of the median junction marking selector. The address of a median junction of the stage 14 being defined, as has been seen above, by the parameters $A_0A_6$GEF the address register 344 comprises eight trigger circuits $\mathbf{344_1}$ to $\mathbf{344_8}$, one for each of the binary digits of these parameters and additionally a marking trigger circuit $\mathbf{344_0}$. The trigger circuits $\mathbf{344_1}$ and $\mathbf{344_2}$ register the four possible values of the parameter E which are decoded by a primary decoder $\mathbf{343_1}$ when a deblocking pulse is applied to it by the marking trigger circuit $\mathbf{344_0}$. The parameter G is decoded under the action of the same deblocking pulse by the primary decoder $\mathbf{343_4}$ associated with the trigger circuits $\mathbf{344_7}$ and $\mathbf{344_8}$. The parameter F on the one hand and the group of parameters $A_0A_6$ on the other hand are respectively decoded by the primary decoders $\mathbf{343_2}$, which are permanently unblocked, associated with the trigger circuits $\mathbf{344_3}$ and $\mathbf{344_4}$, and $\mathbf{343_3}$ associated with the trigger circuits $\mathbf{344_5}$ and $\mathbf{344_6}$. The primary decoder $\mathbf{343_1}$ is connected through a polarity-inverter amplifier $\mathbf{342_1}$ to the line inputs of a secondary decoder $\mathbf{341_1}$, and primary decoder $\mathbf{343_4}$ is connected by a polarity-inverter amplifier $\mathbf{342_2}$ to the column inputs of a secondary decoder $\mathbf{341_2}$. The outputs of the decoders $\mathbf{342_2}$ and $\mathbf{343_3}$ are respectively connected to the column inputs of the secondary decoder $\mathbf{341_1}$ and to the line inputs of the secondary decoder $\mathbf{341_2}$. The primary decoders and the intermediate stage which connects them to the secondary decoders are constructed in known manner, such as for example that described in U.S. Patent No. 3,004,109 which was granted to the present applicants on October 10, 1961, and entitled, "Electronic Device for the Rapid Scanning of a Plurality of Electrical Devices."

The output signals of the primary decoders are negative pulses of 12 volts' amplitude between 325 volts+6 volts and 325 volts−6 volts. Thus, during the marking, that is to say when the trigger circuit $\mathbf{344_0}$ is in operation, the output of the decoder $\mathbf{343_1}$ corresponding to the value of E represented by the condition of the trigger circuits $\mathbf{344_1}$ and $\mathbf{344_2}$ changes to 325−6 volts, the other outputs remaining at 325+6 volts.

Figure 7:
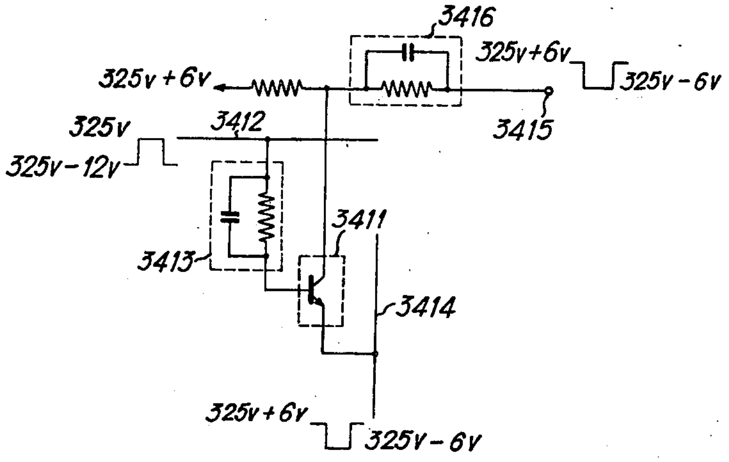
FIGURE 7 is a circuit diagram of a part constituting one element of FIGURE 6.

The output pulses of the primary decoders $\mathbf{343_1}$ and $\mathbf{343_4}$ are converted in the intermediate stage 342 into positive pulses of 12 volts' amplitude between 325−12 volts and 325 volts. The secondary decoders $\mathbf{341_1}$ and $\mathbf{341_2}$ respectively energize the rows and columns of the matrix 340 of the final stage. The secondary decoder $\mathbf{431_2}$ is a matrix constituted, like the secondary decoders of the above-mentioned U.S. Patent No. 3,004,109, of p-n-p transistors having their bases connected to a row and their emitters connected to a column. All these transistors are blocked permanently with the exception of that of which the base and the emitter each receive a pulse, that is to say are brought respectively to 325−6 volts and to 325 volts. The collector of this transistor supplies a positive pulse of 12 volts' amplitude between 325−12 volts and 325 volts. The secondary decoder $\mathbf{341_1}$ is a matrix constituted of n-p-n transistors, the assembly of which is indicated in FIGURE 7. The transistor 3411 has its base connected to a line 3412 by an RC circuit 3413, its emitter directly connected to a column 3414 and its collector connected to an output terminal 3415 through an RC circuit 3416. Only the transistor of the matrix $\mathbf{341_1}$ having its base at 325 volts and its emitter at 325−6 volts is unblocked; its collector then changes from 325+6 volts to 325−6 volts. The final stage 340 is a matrix constituted of p-n-p transistors like the matrix $\mathbf{341_2}$. These transistors, one of which is shown at $\mathbf{34_1}$ in FIGURE 4, have their collectors at 325−35 volts, that is to say at 290 volts. Only that one of which the base is connected to a collector of the decoder $\mathbf{341_1}$ at 325−6 volts and of which the emitter is connected to a collector of the decoder $\mathbf{341_2}$ at 325 volts is unblocked. Its collector changes from 290 volts to 325 volts and this potential, applied to the median junction $\mathbf{14_i}$, causes the firing of the gas-filled tubes of the connection stages in accordance with the markings of the end and intermediate junctions.

The line equipment marking selector operates on the same principles as the median junction selector of which it is an adaptation for the number of parameters constituting the address of a line equipment and of binary digits expressing these parameters. The address of a line equipment is in fact composed of four parameters $A_0$ $B_0$ $C_0$ $D_0$ or $A_6$ $B_6$ $C_6$ $D_6$, the first of which comprises a single binary digit, the last three and the other two. One advantageous arrangement consists in taking for the final stage a matrix having as many columns as there are possible values of the parameters $D_0$ or $D_6$, that is to say 8, and to control these 8 columns directly by a polarity-inverter amplifier similar to $\mathbf{342_1}$ or $\mathbf{342_2}$, connected to the outputs of a primary decoder serving three trigger circuits connected with the recording of $D_0$ or $D_6$ while the lines of the final stage matrix are controlled through the intermediary of a secondary decorder which receives the other elements of the address, as in the preceding case. The potentials of the line equipment marking selector 39 vary with respect to earth potential as the potentials of the median junction marking selector 34 vary with respect to 325 volts, the only difference being that, as shown in FIGURE 4, the collector potential of the transistors such as $\mathbf{39_i}$ is −50 volts.

Figure 8:
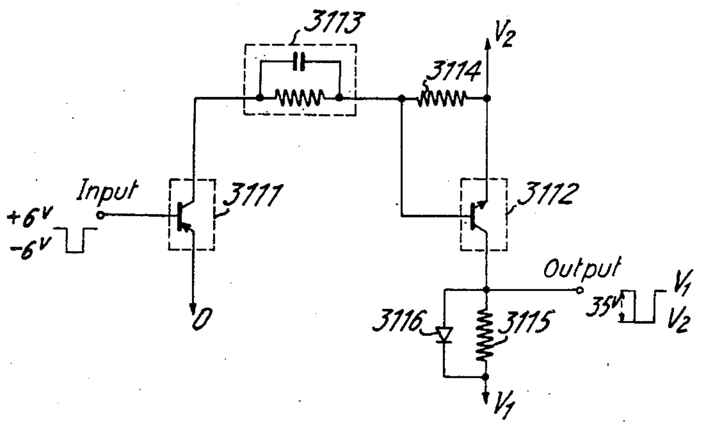
FIGURE 8 is a circuit diagram of an output unit of a marking selector for intermediate junctions.

The intermediate and end junction marking selectors are reduced to a register of small capacity, a decoder and an output stage. As they are responsive to group addresses comprising one or two parameters and as three binary digits at a maximum suffice to express them, their decoders are formed by borrowing from the decoders of the other marking selectors, which necessitates voltage transfers which are effected in a special final stage of which FIGURE 8 shows one element. This output stage of an intermediate or end junction marking selector, for example the marking selector 31 for the end junction 11, is a two-stage amplifier of which the first stage is provided with a p-n-p transistor 3111 and the second stage with a n-p-n transistor 3112. The collector of the transistor 3111, the emitter of which is at earth potential, is connected through an RC circuit 3113 on the one hand to the base of transistor 3112 and on the other hand through a resistor 3114 to the emitter of this transistor 3112 and to a source of potential $V_2$.

The collector of transistor 3112 is conected to a source of potential $V_1=V_1+35$ volts through a resistor 3115 shunted by a diode 3116 in a direction suitable for reducing the coupling between junctions connected to the same collector. If the base of transistor 3111 is at +6 volts, the two transistors are blocked and the potential of the collector of transistor 3112 is $V_1$. For the duration of a pulse of potential −6 volts applied to the base of transistor 3111, the two transistors are saturated and the output potential is $V_2$. A negative pulse of amplitude 35 volts is applied to the group of junctions 11 having the group address recorded in the register of the marking selector 31.

The addresses concerned with the end and intermediate junction marking selectors, their number of outputs and the value of their potentials $V_1$ and $V_2$ are given in the following table:

| Selector | Stage | Address | Number of outputs | $V_1$ | $V_2$ |
|---|---|---|---|---|---|
| 31 | 11 | $D_0$ | 8 | −50 | −85 |
| 32 | 12 | $XC_0$ | 8 | +50 | +15 |
| 33 | 13 | $B_0$ | 4 | +150 | +115 |
| 35 | 15 | $E_0$ | 4 | +150 | +115 |
| 36 | 16 | $YC_6$ | 8 | +50 | +15 |
| 37 | 17 | $D_6$ | 8 | −50 | −85 |

The values of the potentials $V_1$ and $V_2$ are reproduced in FIGURE 4 in which will be seen the output transistors of the marking selectors 31, 32 and 33.

*Testers*

Figure 9:
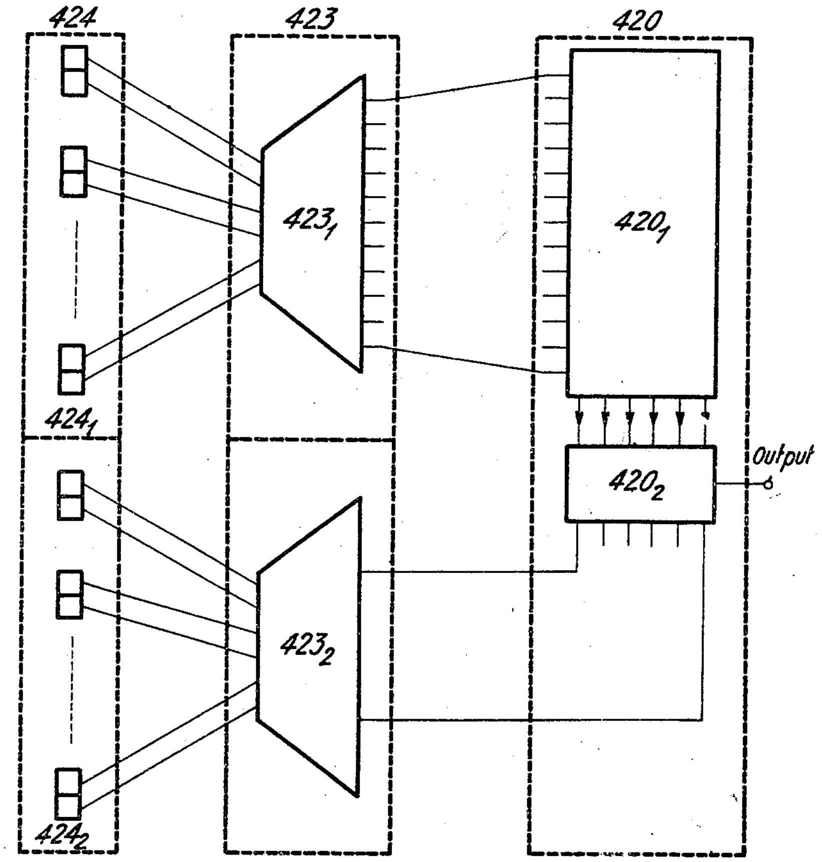
FIGURE 9 shows diagrammatically a tester.

The testers 42 to 46, the circuit diagram of which is given in FIGURE 9, are in accordance with the "Electronic Device for the Rapid Scanning of a Plurality of Electric Devices," described in U.S. Patent 3,004,109 which has already been mentioned. The intermediate junction testers 42, 43, 45 and 46 are identical. The intermediate junction tester 42 for example is essentially composed of a register 424 divided into two parts $424_1$ and $424_2$, a decoder unit 423 also divided into two parts $423_1$ and $423_2$ and a final stage 420 comprising a matrix $420_1$ of test points, such as previously defined, and an output unit $420_2$. A test pulse applied through the decoder $423_1$ to all the test points of the line of matrix $420_1$, the address of which is recorded in the part $424_1$ of register 424, gives rise to a signal on each column of the matrix corresponding to the test point of an engaged junction. The columns are connected to a common output through the output unit $420_2$ composed of gates controlled by the decoder $423_2$. Only the gate the number of which is indicated in the part $424_2$ of the register is open. The output unit $420_2$ comprises an inhibiting gate which supplies an output pulse when no reply signal corresponds to a test pulse, that is to say when the tested junction is free, and which supplies no output pulse in the contrary case. The appearance or the absense of a pulse at the output of the output unit $420_2$ thus characterizes the free or engaged condition of the intermediate junction of which the number is indicated in the address register 424.

The test points of the median junction tester 44 supplying contrary to those of tester 42, a reply signal when the tested junction is free and supplying no reply signal when it is engaged, the tester 44 differs from the tester 42 in that its output has no inhibiting gate inverting the replies.

*Identifiers*

Figure 10:
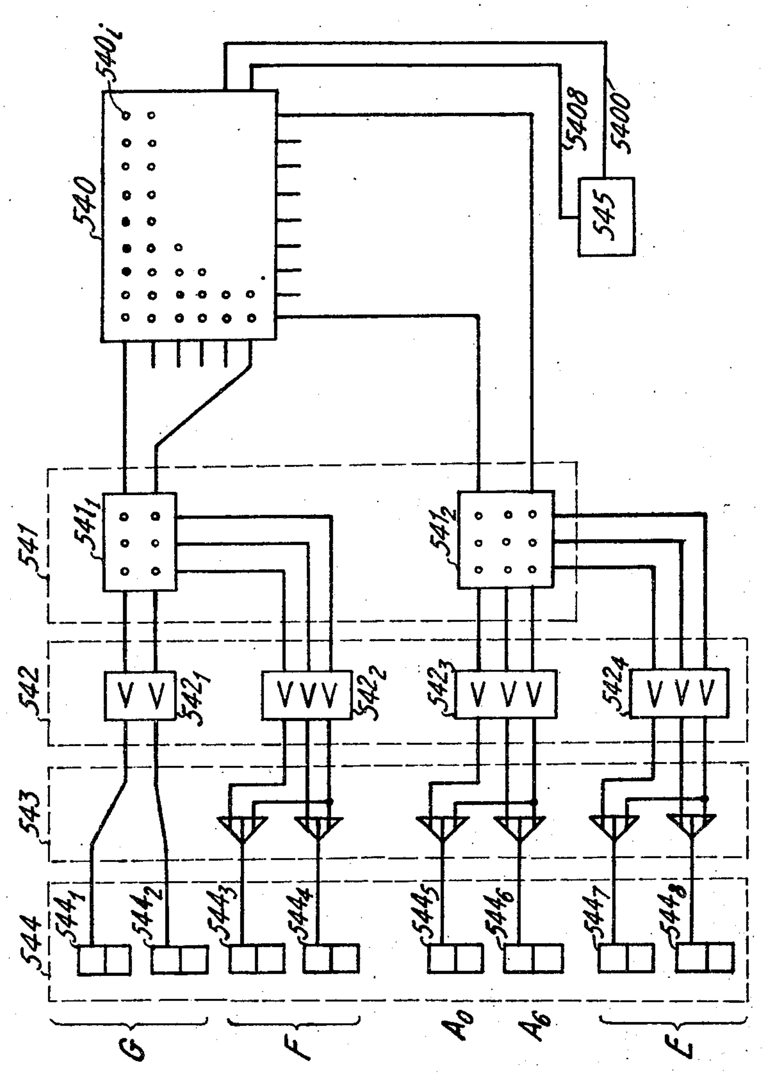
FIGURE 10 shows diagrammatically an identification unit.

The identifier 54 for median junctions 14 shown in FIGURE 10 is composed of a matrix 540 of identification points such as $54_1$ (FIGURE 4) with which is associated a time base 545, a primary coder 541, an intermediate stage 542, a secondary coder 543 and a register 544. The time base 545 provides zero resetting and control pulses through the conductor 5400 which pass in series through all the toroids. It also supplies, through a conductor 5408, for the first tenths of a microsecond of the swinging-over of the toroids, a blocking signal for the reading amplifiers 5406 and 5407, arranged at the line outputs and column outputs of the matrix 540 to eliminate parasitic readings.

Figure 11:
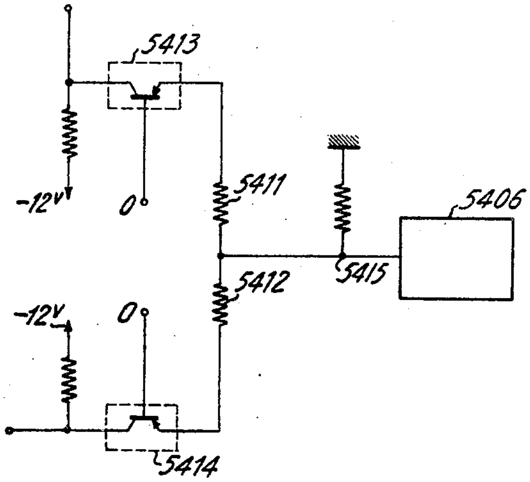
FIGURE 11 is a circuit diagram of a part of the identification unit shown in FIGURE 10.

All the pairs of toroids of a single line have a read winding in series. All the pairs of toroids of the same column have the other read winding in series. The swinging-over of the toroid to be identified results in two read pulses, one on the corresponding line and the other on the corresponding column. At the output of each line and of each column the read amplifier 5406 or 5407 converts the read pulse into a positive pulse (0, +6 volts). The pulse from a line of the matrix of identification points 540 drives a preliminary line coding element $541_1$. The different elements of the coder $451_1$ are arranged in matrix form and their circuit diagram is given in FIGURE 11.

Each element of the coder $541_1$ comprises two resistors 5411 and 5412. The resistors 5411 of all the elements of a given line are multiplied on an output line transistor 5413. The resistors 5412 of all the elements of a single column are multipled on a column output transistor 5414. In the idle condition, all the inputs of the matrix of the stage, such as 5415 are at zero potential; the transistors 5413 and 5414 are blocked. If, at an input 5415, a pulse (0, +6 volts) appears, the two transistors 5413 and 5414 of the corresponding line and column outputs are saturated. At each of these outputs a pulse of positive polarity (−12 volts, 0) appears. By virtue of the low input impedance of emitter-driven transistors 5413 and 5414 and of the choice of voltages which is adopted, the coder $541_1$ can have a large capacity ($64\times64=4096$ elements, for example). The pulse from a column of matrix 540 sends two pulses identical to those of the primary line decoder $541_1$ through the primary column decoder $541_2$.

Each of these four pulses is converted in the intermediate stage 542 into a positive pulse (−6 volts+6 volts) which conditions the corresponding trigger circuits of the register 544 through the intermediary of a coding stage 543 composed of "or" gates. The trigger circuits $544_1$ to $544_8$ are thus placed in conditions representing the values of the characteristic parameters $A_0$ $A_6$ G E F of the median junctions 14.

The line equipment identifier 59 differs from the identifier 54 only by its identification points such as $59_i$ shown in FIGURE 4, and by the parameters which it is intended to record. The identification points such as $59_i$ are formed by two resistors 5911 and 5912 connected in parallel with the diode 607 of the corresponding line equipment $60_i$. The identification points are arranged in a matrix, the resistors 5911 of all the identification points of a single line of the matrix being multipled on a line output transistor 5913 and the resistors 5912 of all the identification points of a single column being multipled on a column output transistor 5914. It has been seen that after the disconnection of a first half path connected with a median junction $14_i$ a pulse of +12 volts is applied to this junction by the marking selector 34 and spreads to the end junction $11_i$ of the second half path to be disconnected. This junction $11_i$ is thus brought from the potential of −10 volts to a positive potential in the neighbourhood of +2 volts and the diode 607 is unblocked. The current which flows through it divides between the resistors 5911 and 5912 and saturates the transistors 5913 and 5914, giving rise to a positive pulse from zero to +6 volts at each of the corresponding line and column outputs. The identifier 59 records the characteristic parameters of an end junction, either $A_0$ $B_0$ $C_0$ $D_0$ or $A_6$ $B_6$ $C_6$ $D_6$.

*Logic circuits*

The switching logic which is represented by the frame 2 in FIGURE 1 is shown diagrammatically on FIGURE 12 together with its connections, on the one hand with the connection network of which the sub-assemblies 10, 30, 40, 50 and 60 previously described are indicated in a frame 1 which is shown in broken lines, on the other hand with a computer 70 receiving from a suitable scanning device data relating to the condition of service of the telephonic lines $61_1$ to $61_n$ connected to the connection network 1 and deducing from this the connection and disconnection orders of the said telephonic lines including the special incoming or outgoing lines.

After a starting phase, the carrying out of a connection order is split into six phases $\phi_1$ to $\phi_6$, three test phases which can be repeated according to their result, a marking phase, a verification phase, a stop phase, and the execution of a disconnection order is split into five phases, $\phi_{11}$ to $\phi_{15}$, three for the disconnection, one for verification and one stop phase. Each phase is divided into a certain number, fixed or variable, of cycles of 10 microseconds $t_0, t_1 \ldots$ or "orders" which are themselves subdivided into four elemental periods *a*, *b*, *c* and *d* ensuring the internal synchronism of the switching logic.

The sub-assemblies constituting the switching logic are as follows:

(1) A time base 100 providing in recurrent manner, through four special outputs, four base pulses of 1.25 microseconds, *a*, *b*, *c* and *d*, constituting a minor cycle of 10 microseconds in which they are equally shared.

(2) A distributor 200 for the above base pulses supplying through two special outputs two pulses, once set in motion by the computer 70 and until a stop order arising, as will be seen later, from the operation of the following sub-assemblies, in a first minor cycle constituting the starting phase, the two pulses being a zero-restoring pulse RZ and a pulse RP for positioning various registers; and in the following minor cycles, through three special outputs, pulses *b′*, *c′* and *d′* synchronous with *b*, *c* and *d* and clocking the operation of the various following sub-assemblies.

(3) The phase circuits 300 which determine the programme of logical operations to be effected as a function of the orders received from the computer 70 and of the condition of the connection network. These circuits comprises a circuit 310 representing the existing phase, a phase register 320 and a phase decoder 330, a counting register 340 and associated decorder 350. The circuit 310, at each minor cycle, causes the advancement of either the register 340 if a phase is taking place, or the phase register 320 in the opposite case, and then restores the register 340 to zero. The phase decoder 330 applies a significant potential on that one of its outputs which corresponds to the phase the number of which is recorded in the register 320. In the same way the decoder 350 applies a significant potential on that one of its outputs which corresponds to the number of minor cycles which have passed in a single phase.

(4) A principal register 500 comprising a register 510 for the addresses $A_0$ $B_0$ $C_0$ $D_0$ of the incoming junctions, a register 530 for the addresses $A_6$ $B_6$ $C_6$ $D_6$ of the outgoing junctions and a register 520 made up of three independent parts, two of which are for the part EX, FY of the addresses of the intermediate junctions and the third of which is for the part G of the address of the median junctions. The registers 510 and 530 are conditioned, for a connection, by the computer 70 and for a disconnection one by the computer 70 and the other by the identifiers 50 which in this case also condition the register 520. The registers 510 and 530 are restored to zero by the pulse RZ. The register 520 remains in its final condition of its last effected operation.

(5) Advancement circuits 400 comprising in advancement control circuit 410 and an advancement checking circuit 420, which ensure, as will be described in detail later, the advancement of the intermediate and median junction addresses in the register 520 with the necessary phase changes until the discovery of an available path or of a blocked state, this latter eventuality causing the stopping of the distributor 200. The advancement checking circuit 420 is essentially a register similar to the register 520, advancing at the same time as this latter but which is restored to zero by the pulse RZ.

(6) Transfer circuits 600 which ensure the necessary connections, on the one hand between the principal register 500 and the registers of the selectors 30 and testers 40 and on the other hand between the phase circuits 300 and the testers 40, selectors 30 and identifiers 50 for the control of the marking and identification tests and additionally between the principal register 500 and the computer 70 for maintenance purposes.

(7) A routing circuit 700 which ensures on the one hand the routing of the requesting or requested line address provided by the computer 70, respectively to the outgoing junction registers 530 and incoming junction registers 510, and on the other hand for a disconnection operation the median junction and second end junction addresses of a path to be disconnected coming from the identifiers 50, respectively to the median junction register 520 and to the register 510 or 530 concerned.

(8) A stop circuit 800 acting on the distributor 200 during the verification phases $\phi_5$ and $\phi_{14}$ in the case of an incorrect test, and during the stop phases $\phi_6$ and $\phi_{15}$ if the required operation has been correctly effected.

Figure 13:
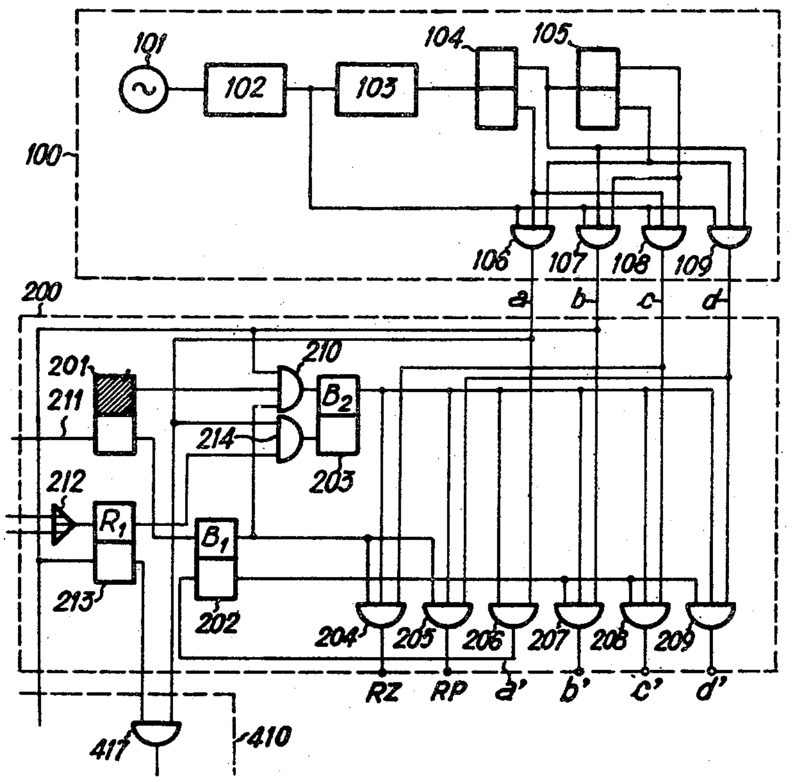
FIGURE 13 shows the time base and the pulse distributor of the switching logic shown in FIGURE 12.

The time base 100 and the distributor 200 are shown in FIGURE 13.

The time base 100 includes a sinusoidal oscillator 101 operating at 400 kc./s. the output of which is applied to an amplifier-limiter 102 supplying square wave signals of period 2.5 microseconds. These signals are applied on the one hand through a delay line 103 of 1.25 microseconds delay to two trigger circuits 104 and 105 arranged as a counter, and on the other hand to one of the three inputs of each of four diode "and" gates 106, 107, 108 and 109, the other inputs of which are connected to the outputs of the trigger circuits 104 and 105 in such a manner as to provide the base pulses, *a*, *b*, *c* and *d* as previously defined.

The distributor 200 comprises: a monostable trigger circuit 201 serving to shape a starting pulse coming from the computer 70 through the conductor 211; an "and" gate 210 with three inputs, the first connected to the output of the gate 107 from which the pulses *b* arrive, the second to the "on" output of the trigger circuit 202 and the third to the "off" output of the trigger circuit 201; a trigger circuit 203 having its "on" input connected to the output of the gate 210; a trigger circuit 213 having its "on" input connected to the output of an "or" gate 212 through which stop pulses for the distributor 200 arrive from the advancement circuits 400 and from the stop circuit 800, and its "off" input connected to the output of the gate 107 through which the pulses *b* arrive; as will be seen later, the pulse *b* which restores the trigger circuit 213 is also transmitted to the advancement control circuit 410, the "off" output of the trigger circuit 213 is connected to one input of an "and" gate 417 of the circuit 410, and the output of the gate 106, through which the pulses *a* arrive, is connected to the second input of the gate 417; an "and" gate 214 having an input connected to the "on" output of the trigger circuit 213, a second input connected to the output of the gate 106 through which the pulses *a* arrive and its output connected to the off input of the trigger circuit 203; six "and" gates 204 to 209 which are all closed when the trigger circuit 203 is in its off condition—the gates 204 and 205 each have one input connected to the on output of the trigger circuit 202 and a further input connected respectively in the case of the gate 204 to the output of the gate 108 through which the pulses *c* arrive, and in the case of the gate 205 to the output of the gate 109 through which the pulses *d* arrive—the gate 206 has a second input connected to the output of the gate 106 through which the pulse *a* pass and its output connected to the off input of the trigger circuit 202—the gates 207, 208 and 209 have a second input connected to the off output of the trigger circuit 202 and a third input connected to the output of the gates 107, 108 and 109 respectively through which arrive pulses *b*, *c* and *d*.

Figure 14:
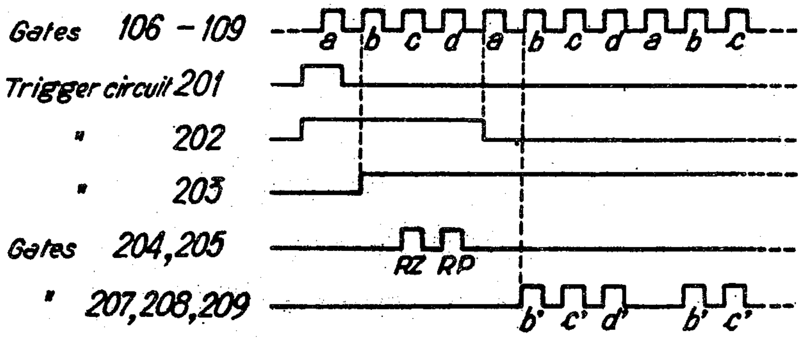
FIGURE 14 is a diagram showing the operating times of the time base and the pulse distributor of FIGURE 13.

FIGURE 14 shows how these circuits enable the starting of the switching network by a signal which is not synchronised with the time base 100. The first pulse *b* arriving after the end of the starting signal initiates a special phase known as a starting phase during which the trigger circuits 202 and 203 being both in operation, the pulse *c* causes a general zero resetting pulse RZ to be sent through the gate 204 and the pulse *d* causes a pulse RP for positioning the main register 500 to be sent through the gate 205. The following pulse $a$ restores the trigger circuit 202 and the pulses $b$, $c$ and $d$ then cause pulses $b'$, $c'$ and $d'$ to be sent through the gates 207, 208 and 209 until the resetting of the trigger circuit 203 by the pulse $a$ following the switching to operated condition of the stop trigger circuit 213.

Figure 15:
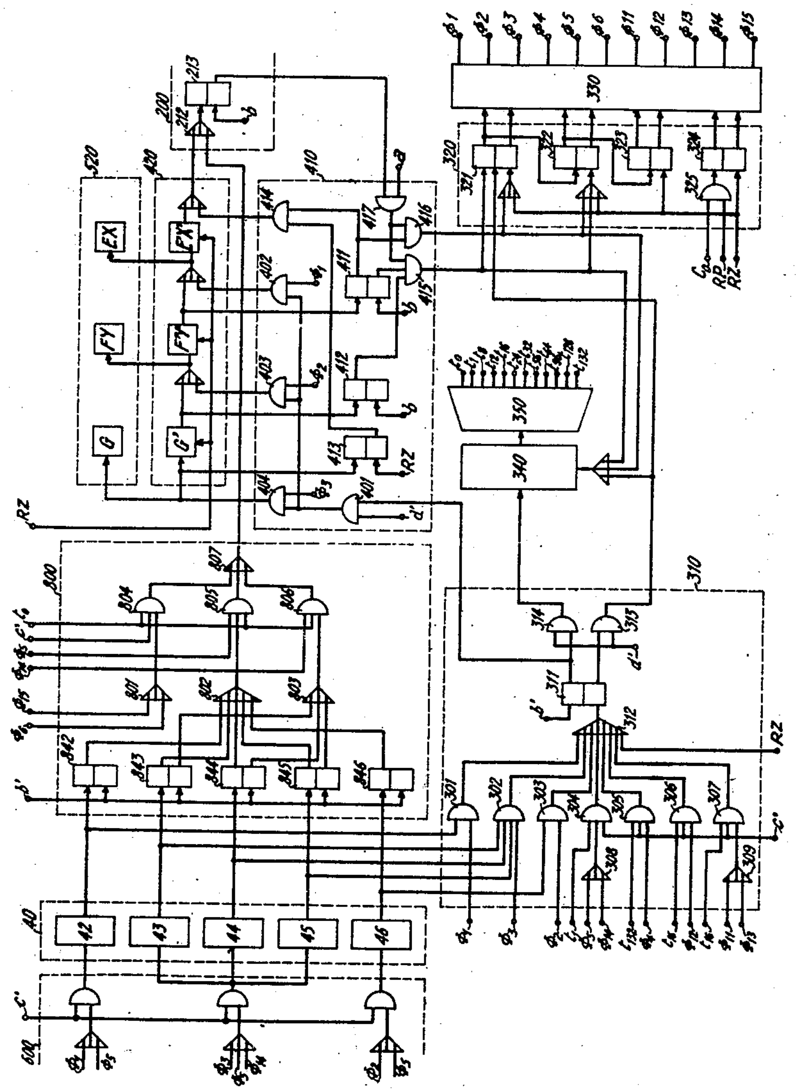
FIGURE 15 is a diagram showing the structure and the operation of the principal sub-assemblies of the switching logic.

The phase circuits 300, the advancement circuits 400, the part of the transfer circuits 600 relating to the application of test pulses to the testers 42 to 46 and the stop circuit 800 are shown in FIGURE 15.

The phase circuits consist of a circuit 310 indicating the existing phase, a phase register 320 and a phase decoder 330, a counting register 340 and an associated decoder 350.

The circuit 310 includes: a trigger circuit 311 which is set to its operated condition by the first pulse $b'$ following a starting phase; a group of "and" gates 301 to 307 and "or" gates 308, 309 and 312 which determine the restoring conditions of the trigger circuit 311; two "and" gates 313 and 314 which transmit the pulses $d'$, the first to the phase register 320 when the trigger circuit 311 is in its off condition, that is to say if no phase is in operation, the second to the counting register 340 when the trigger circuit 311 is in its operated condition.

The phase register 320 consists of four trigger circuits 321 to 324 which are all restored by the pulse RZ and the last of which is set to its operated condition by the pulse RP through an "and" gate 325 when this latter is unblocked by a potential C$o$ coming from the computer 70 and characterizing a connection order; the trigger circuits 321 to 323 are arranged as a counter and are advanced under the effect of pulses $d'$ which have passed through the gate 313 when the trigger circuit 311 is in its off condition; the trigger circuits 321 and 322 can additionally be conditioned by the advancement control circuit 410 as will be seen later.

The phase decoder 330 is a group of 11 "and" gates each having four inputs connected to the "on" or "off" outputs of the trigger circuits 321 to 324 and the outputs of which respectively corresponding to the six connection phases $\phi_1$ to $\phi_6$ (trigger circuit 324 in operated condition) and to the five disconnection phases $\phi_{11}$ to $\phi_{15}$ (trigger circuit 324 in off condition) are connected as follows: the outputs $\phi_1$, $\phi_2$, $\phi_3$, $\phi_5$, $\phi_{11}$, $\phi_{12}$, $\phi_{13}$, $\phi_{14}$ and $\phi_{15}$ to the restoring circuits of the trigger circuit 311; the outputs $\phi_1$, $\phi_2$, $\phi_3$ to the advancement control circuit 410; the outputs $\phi_5$, $\phi_6$, $\phi_{14}$, $\phi_{15}$ to the stop circuit 800; the outputs $\phi_1$ to $\phi_{15}$ to the transfer circuits 600.

The counting register 340 consists of eight trigger circuits arranged as a counter which advances under the control of pulses $d'$ which have passed through the gate 314 when the trigger 311 is in its operated condition; it is restored to zero at each pulse for advancing the register 320 coming through the gate 313 and, as will be seen later, at each pulse for resetting to "zero" or to "one" this register 320 through the advancement control circuit 410.

The counting decoder 350 is a group of "and" gates connected to the different outputs of the register 340 and terminating in twelve outputs $t_0$, $t_1$, $t_8$, $t_{12}$, $t_{16}$, $t_{24}$, $t_{32}$, $t_{56}$, $t_{64}$, $t_{96}$, $t_{128}$, $t_{132}$ each of which corresponds to the index number in cycles of 10 microseconds counted by the register 340 since the beginning of the phase which is in operation. By means of "and" gates connected to one of these 12 outputs, to one or more of the outputs $\phi_1$ to $\phi_6$, $\phi_{11}$ to $\phi_{15}$ of the decoder 330 and to one of the output gates 207, 208 and 209 of the distributor 200, pulses $b'$, $c'$ or $d'$ can be applied in the desired cycle and phase conditions to various sub-assemblies of the switching network as will be seen later.

The advancement circuit 400 has for its object to cause the three parts EX, FY and G of the register 520 to be advanced independently during the test phases $\phi_1$, $\phi_2$ and $\phi_3$ to seek a free path according to the process described in the preceding paragraph entitled "Principles of connection of a path."

As the parameters E and F can each have four values and the parameters X and Y can each have two values, the parts EX and FY of the register 520 are composed of three trigger circuits each, two of which are for E or F and the third for X or Y; as the parameter G can take three values the corresponding part of the register 520 comprises two trigger circuits which can only assume three values. The test counting register 420, constituted by three parts E'X', F'Y' and G' similar to the analogous parts of the register 520 and restored to zero by the pulse RZ of the starting phase, enables the checking of the end of a test phase, what is not available from the register 520 remaining in the final position of the last effected operation. To this end, the three parts of the register 420 advance at the same time as the corresponding parts of the register 520 and supply a pulse, known as a carry-over pulse, each time that in advancing they return to zero. The carry-over output of E'X' is connected to the gate 212 controlling the stop trigger circuit 213 of the distributor 200; the carry-over output of F'Y' is connected in parallel to the two advancement inputs of EX and E'X' and to the circuit 410; the carry-over output of G' is connected in parallel to the advancement inputs of FY and F'Y' and to the circuit 410.

The test-advancement control circuit 410 comprises an input "and" gate 401 which transmits pulses $d'$, provided that the phase trigger circuit 311 is in its operated condition, to three "and" gates 402, 403 and 404 which respectively control the advancement of the parts of the register EX, E'X'–EY, E'Y'–G, G', during the phases $\phi_1$, $\phi_2$ and $\phi_3$; a trigger circuit 411 which is set to its operated condition by a carry-over pulse coming from F'Y' and having its "on" output connected on the one hand to one input of an "and" gate 414 and on the other hand to one input of an "and" gate 416; a trigger circuit 412 which is set to its operated condition by a carry-over pulse coming from G' and having its "on" output connected to an input of a three-input "and" gate 415 of which the second input is connected to the "off" output of the trigger circuit 411; the trigger circuits 411 and 412 are restored to their rest condition by the pulse $b$; a trigger circuit 413 which is set to its operated condition by the advancement pulse of G, G' coming from the gate 404 and is restored to its rest condition by the pulse RZ; the "off" output of the trigger circuit 413 is connected to the second input of gate 414 the output of which is connected to the gate 212 controlling the stop trigger circuit 213 of the distributor 200; an "and" gate 417 transmitting pulse $a$ coming from gate 106 of the time base 100, provided that the trigger circuit 213 is in its rest condition, to two gates 415 and 416 in parallel; if the trigger circuit 411 is in its operated condition the pulse $a$ is transmitted through the gate 416 to the trigger circuits 321 and 322 of the phase register 320 which is thereby reset to zero, which corresponds to the phase $\phi_1$; if the trigger circuit 411 is in its rest condition and the trigger circuit 412 is in its operated condition the pulse $a$ is transmitted through the gate 415 to the register 320 which it sets to the phase $\phi_2$.

The stop circuit 800 comprises: a test memory consisting of five trigger circuits 842, to 846 respectively associated with the testers 42 to 46; an "or" gate 801 having two inputs connected respectively to the outputs $\phi_6$ and $\phi_{15}$ of the decoder 330; an "or" gate 802 having five inputs connected respectively to the five "on" outputs of the trigger circuits 842 to 846; an "or" gate 803 having three inputs connected respectively to the three "off" outputs of the trigger circuits 843, 844 and 845; an "and" gate 804 having one input connected to the output of gate 801, a second input connected to the gate 208 from which the pulses $c'$ are supplied and a third input connected to the output $t_0$ of the decoder 350; an "and" gate 805 having an input connected to the output of gate 802, a second input connected to the output $\phi_5$ of the phase decoder 330 and a third input connected to the output $t_0$ of decoder 350; an "and" gate 806 having one input connected to the output of gate 803, a second input connected to the output $\phi_{14}$ of the decoder 330 and a third input connected to the output $t_0$ of decoder 350; an "and" gate 807 having three inputs respectively connected to the outputs of gates 804, 805 and 806 and its output connected to an input of gate 212 controlling the stop trigger circuit 213 of the distributor 200.

The transfer circuits 600 are essentially composed of "or" gates and "and" gates which are unblocked by the phase decoder 330 at times suitable for transmitting marking and transfer control pulses *b'* and test control pulses *c'* as well as the routing of the addresses of lines to be disconnected arriving successively from the computer 70 and from the line equipment identifier 59 to the register 510 or 530 and the transfer operations which result therefrom according to the relevant indication given by the computer.

The routing circuit 700 is composed as follows: an end identification trigger circuit conditioned by the computer for a disconnection operation in a first stable state known as the "zero" state, or in a second stable state known as the "one" state, according to whether the known end of the path to be disconnected is an incoming junction $A_0B_0C_0D_0$ or an outgoing junction $A_6B_6C_6D_6$; a group of gates ensuring on the one hand the unconditional connection between the computer and each of the registers 510 and 530 as well as between the median junction identifier 54 and the median junction register, and on the other hand, under the control of the end identification trigger circuit at the time of a disconnection operation, the switching of the part $A_6$ or $A_0$ of the median junction identifier 54 and the part $B_6C_6D_6$ or $B_0C_0D_0$ of the line equipment identifier 59 to the inputs of the six trigger circuits of register 530 associated with $A_6B_6C_6D_6$ or the six trigger circuits of register 510 associated with $A_0B_0C_0D_0$ according to whether the identity identification trigger circuit is in "zero" or "one" condition.

The operation of the switching logic which is formed in this manner is as follows:

A starting signal from computer 70 to distributor 200 having caused the starting of this latter by means of a pulse *b* setting the trigger circuit 203 in its operated condition and the trigger circuit 213 in its rest condition in the conditions defined in connection with FIGURES 13 and 14, the pulse *b* additionally restores to rest condition the trigger circuits 411 and 412; the signal RZ arriving at instant *c* of the starting phase restores to zero condition the various logical sub-assemblies, particularly the trigger circuit 311, the four trigger circuits of the phase register 320, the trigger circuit 413, the register 420 and the registers 510 and 530. If the operation to be effected is a connection operation, the computer 70 applies a deblocking potential *Co* to the gate 325 for setting to its operated condition the trigger circuit 324 of the phase register 320. The pulse RP which follows at instant *d* causes the transfer of the addresses of incoming line $A_0B_0C_0D_0$ and outgoing line $A_6B_6C_6D_6$ to be connected, from the computer 70 to the registers 510 and 530 respectively and additionally sets the trigger circuit 324 to its operated condition. If the operation to be effected is a disconnection the pulse RP causes the same transfer between the computer 70 and the registers 510 and 530 but gate 325 remains blocked and computer 70 sets the end indicating trigger circuit of routing circuit 700 to zero or to one according to whether the known end of the path to be disconnected is an incoming line or an outgoing line.

For a connection, at the end of the starting phase, the two registers 510 and 530 are in agreement with the addresses $A_0B_0C_0D_0$ and $A_6B_6C_6D_6$ of the incoming and outgoing lines to be connected, the trigger circuits 321, 322 and 323 and in the rest condition and the trigger circuit 324 is in the operated condition, this being expressed by a characteristic potential at the output $\phi_1$ of the decoder 330; the counting register 340 is also at zero, this being expressed by a characteristic potential at the output $t_0$ of the decoder 350. The pulse *a'* passing through gate 206 initiates cycle $t_0$ of the phase $\phi_1$ by restoring to rest condition the trigger circuit 202. Pulse *b'* coming from gate 207 sets, through the intermediary of transfer circuits 600, the register of the tester 42 in accordance with the parameters $A_0B_0C_0$ recorded in the register 510 and the parameters EX recorded in the register 520, sets the trigger circuit 311 to its operated condition and restores to rest condition the trigger circuits 842 to 846. Pulse *c'* is the test pulse for that one of the eight junctions of stage 12 of which the parameters $A_0B_0C_0$ and EX have been transferred to the register of the decoder 42. If the junction is engaged the tester does not provide a reply pulse, and the pulse *d'* passing on the one hand through gates 401 and 402 causes the advancement of the parts EX and E'X' of registers 520 and 420 each by unity, and passing on the other hand through gate 314, which is open owing to the fact that the trigger 311 is in the operated condition, causes the advancement of the counting register 340 and the indication of the cycle $t_1$ by decoder 350. The operations effected during cycle $t_0$ are repeated from cycle to cycle at each of the eight junctions EX of stage 12 capable of being connected to the matrix of parameters $A_0B_0C_0$ as long as none of these junctions is found to be free, until cycle $t_7$ during which the eight of these junctions being tested pulse *d'* for advancing the parts of the register 520 and E'X' of register 420 gives rise to the generation by the latter of a carry-over pulse which, through the "or" gate 212, sets trigger circuit 213 to its operated condition, thereby causing at the following time *a* the restoration to rest condition of trigger circuit 203 and the blockage of output gates 204 to 209 of distributor 200. When one of the junctions is free the tester 42 supplies at time *c* a reply pulse which passes through "and" gate 301 unblocked in phase $\phi_1$, and passing through "or" gate 312 restores to rest condition the phase trigger circuit 311. Pulse *d'* cannot then pass through "and" gate 314, but passes through "and" gate 313 to advance register 320 from phase $\phi_1$ to phase $\phi_2$ and to restore to zero the counting register 340. During phase $\phi_2$, test operations analogous to those of phase $\phi_1$ are effected by means of tester 46 on junctions FY of stage 16 which are capable of being connected to the matrix of parameters $A_6B_6C_6$. If none of these eight junctions is free, a carry-over pulse is applied at time *d* through the part F'Y' of register 420 on the one hand to trigger circuit 411 which passes to its operated condition and on the other hand to the register parts EX and E'X' which advance by unity. The trigger circuit 413 being in its rest condition, the "and" gate 414 is not blocked and the passage of trigger circuit 411 to its operated condition sets trigger circuit 213 to its operated condition, as a consequence of which the distributor 200 is stopped by the following pulse *a*. If one of the tested junctions is free, the tester 46 supplies at time *c* a pulse which traverses the open gate 303 in phase $\phi_2$ and restores to rest condition the phase trigger circuit 311. The pulse *d'* is then transmitted through gate 313 to phase register 320 which advances from phase $\phi_2$ to phase $\phi_3$. In phase $\phi_3$ the pulse *b* having restored to rest condition trigger circuit 411 if it were in operated condition, test operations similar to the preceding ones are effected simultaneously by means of testers 43, 44 and 45 on junctions 13, 14 and 15 corresponding to the values of E and F determined in the preceding phases and answering to the following parameters:

Junction 13: $A_0B_0EA_6G$
Junction 14: $A_0A_6EFG$
Junction 15: $A_6B_6FA_0G$ with G, which can have three values, as the common variable parameter. If for the first tested value of G at time $c$ one at least of the three above junctions is engaged, gate 302 remains blocked. The following pulse $d'$ causes the advancement by unity on the one hand of parts G and G' of registers 520 and 420 and on the other hand the counting register 340, and additionally sets to its operated condition trigger circuit 413 thereby blocking gate 414. If neither of the two other possible values of G which are also tested during the cycles $t_1$ and $t_2$ are suitable, a carry-over pulse from G' sets trigger circuit 412 to operated condition and advances by unity the register elements FY and F'Y'. If the junction 16 found to be free in phase $\phi_2$ was the eighth tested junction of stage 16, a carry-over pulse provided by F'Y' causes the register elements EX, E'X' to be advanced by unity and sets trigger circuit 411 to its operated condition; gate 416 is then unblocked, the following pulse $a$ restores register 320 to phase $\phi_1$ and pulse $b$ restores to rest condition trigger circuits 411 and 412. As soon as a carry-over pulse appears at the output of register element E'X', which has not been restored to zero since the beginning of the connection operation, the stop trigger circuit 213 is set to its operating condition. If a new value of EX is appropriate, a return to phase $\phi_2$ takes place and the eight values of FY can be tried once again. The setting of trigger circuit 411 to its operated condition by a carry-over pulse at the output of F'Y' does not cause the stop trigger circuit 213 to be set to its operated condition, gate 414 being blocked owing to the fact that trigger circuit 413 is operated, but unblocks gate 416 for the restoration to phase $\phi_1$. The stoppage after the passage to phase $\phi_3$ is thus only effected when after a return to phase $\phi_1$ a carry-over pulse appears at the output of E'X'. If on the return from phase $\phi_3$ to phase $\phi_2$ no carry-over pulse appears at the output of F'Y', trigger circuit 411 remains in its rest condition and the trigger circuits 213 and 412 being respectively at rest and in operated condition, gate 416 is blocked and pulse $a$ is transmitted through gate 415, which is unblocked, to restore the phase register 320 to phase $\phi_2$. If a new value of F'Y' is appropriate, a return to phase $\phi_3$ takes place, if not, the carry-over pulse of F'Y' causes a return to phase $\phi_1$ as above.

If for a value of G the three above-determined junctions of stages 13, 14 and 15 are free, at time $c$ the reply pulses of testers 43, 44 and 45 simultaneously pass through gate 302, which is unblocked in phase $\phi_3$, and restore to rest condition trigger circuit 311. Pulse $d'$ then passes through gate 313 and causes register 320 to advance the phase $\phi_4$ at the same time as it restores to zero the counting register 340.

Phase $\phi_4$ is the connection phase which lasts for 132 cycles of 10 microseconds and during which the marking of the junctions selected during the preceding phases $\phi_1$, $\phi_2$ and $\phi_3$ and the parameters of which are recorded in registers 500 is effected according to the programme of FIGURE 5 in the following conditions:

In cycle $t_0$ pulse $b'$ positions the registers of the marking selectors 30 in accordance with registers 500 and the trigger circuit 311 in its operated condition and pulse $d'$ advances register 340 to $t_1$. In cycle $t_1$ pulse $b'$ causes the marking of the junctions designated in this manner in the median junction stages 14 and intermediate junction stages 13 and 15 through the markers 34, 33 and 35, and pulse $d'$ advances register 340 to $t_2$. In cycle $t_2$ and in the following cycles the positioning of the marking registers 31 to 37 is confirmed at time $b$ and the number of the cycle is increased by unity at time $d$. At time $b$ also, at cycle $t_{24}$ the markers 32 and 36 of intermediate junctions 12 and 16 receive a marking order; at cycle $t_{32}$ markers 33 and 35 receive an end-marking order; at cycle $t_{56}$ markers 31 and 37 of end junctions 11 and 17 receive a marking order; at cycle $t_{64}$ markers 32 and 36 receive an end-marking order; at cycle $t_{96}$ markers 31 and 37 receive an end-marking order; at cycle $t_{128}$ marker 34 of median junctions 14 receives an end-marking order. At cycle 132 pulse $c'$ passing through the gate 305 restores the phase trigger circuit 311 to its rest condition and pulse $d'$ passing through gate 313 advances register 320 to phase $\phi_5$.

Phase $\phi_5$ is the connection verification phase for the path marked during phase $\phi_4$. In cycle $t_0$ pulse $b'$ conditions the registers of the testers 42 to 46 in accordance with the main registers 500 and restores to zero condition the trigger circuits 842 to 846 at the same time as it sets to operated condition the trigger circuit 311; pulse $c'$ is applied to test test inputs of the five testers 42 to 46 and if one at least of these provides a response pulse proving that one of the junctions previously marked has remained free, that is to say that the connection has not been made, one at least of the trigger circuits 842 to 846 passes to its operated condition and the stop trigger circuit 213 is set to its operated condition through the gates 802, 805, 807 and 212; pulse $d'$ advances the counting register 340 to cycle $t_1$.

In cycle $t_1$ if a defective connection has caused the trigger circuit 213 to pass to its operated condition, the pulse $a$ sets the trigger circuit 203 to its rest condition and blocks distributor 200; if the connection has been properly effected, pulse $b'$ restores to their idle conditions the trigger circuits 842 to 846 and sets the phase trigger circuit 311 to its operated condition but pulse $c'$ restores the latter to rest condition, passing through the gates 304 and 312, and pulse $d'$, passing through gate 313, advances the register 320 to phase $\phi_6$.

Phase $\phi_6$ is the stop phase for a connection operation. At cycle $t_0$ the pulse $b'$ sets the trigger circuit 311 to operated condition, the pulse $c'$ passing through gates 804, 807 and 212, sets the stop trigger circuit 213 to operated condition and the pulse $d'$ advances the counting register to cycle $t_1$ in which pulse $a$ restores to rest condition the trigger circuit 203, blocking distributor 200.

For a disconnection operation the known end of the path to be disconnected is designated by the condition of the end-designating trigger circuit of the routing circuit 700. At the end of the starting phase this address, which will be assumed, for example, to be $A_6B_6C_6D_6$, the end-designating trigger circuit being in zero condition, is in place in the register 530, all the trigger circuits of phase register 320 are in rest condition, this being represented by decoder 330 by a characteristic potential at its output terminal $\phi_{11}$, and the counting register 340 is in cycle $t_0$. The pulse passing through gate 206 initiates cycle $t_0$ of phase $\phi_{11}$ by restoring to rest condition the trigger circuit 202. Pulse $b'$ coming from gate 207 conditions, through the intermediary of transfer circuits 600, the register of the line equipment marking selector 37 in accordance with the parameters $A_6B_6C_6D_6$ recorded in register 530 and sets trigger circuit 311 to operated condition. Additionally, it causes the application of a zero-resetting pulse to all the toroids of the median junction identifier 59. At cycle $t_1$, pulse $b'$ orders the commencement of the line equipment $A_6B_6C_6D_6$ marking which causes the disconnection of the half path terminating at this point and, as has been seen, the passage of the toroid associated with the disconnected path to a particular state. At cycle $t_8$, pulse $b'$ causes the application of a second zero-resetting pulse to all the toroids of the identifier 59, as a result of which there appears at the outputs of the read windings of the only toroid of the disconnected half path a pulse which conditions the register of the identifier 59 in accordance with the address $A_0A_6EFG$ of the median junction of the path which is being disconnected. This address is immediately transferred through transfer circuits 600 in the principal register 500. At cycle $t_{12}$ pulse $b'$ orders the end of the line equipment $A_6B_6C_6D_6$ marking and at cycle $t_{16}$, the trigger circuit 311 being restored by pulse $c'$ passing through gates 307 and 312, pulse $d'$ passes through gate 313 and advances register 320 to phase $\phi_{12}$. At cycle $t_0$ of phase $\phi_{12}$ pulse $b'$ causes the marking register 34 to be positioned in accordance with the median junction address $A_0A_6EFG$ transferred to the principal register in the preceding phase. At cycle $t_1$ pulse $b'$ is applied through the thus positioned marker 34 to the median junction $A_0A_6EFG$, as a result of which, as has been seen, the test point of the line equipment $A_0B_0C_0D_0$ connected to this median junction passes to a positive potential, thereby causing the positioning of the register of the identifier 54 according to the address $A_0B_0C_0D_0$ of this line equipment. At cycle $t_8$ the address $A_0B_0C_0D_0$ is transferred from the register of the identifier 54 to the register 510 by pulse $b'$ which at cycle $t_{12}$ orders the end of the marking of the median junction. At cycle $t_{16}$ the transition to phase $\phi_{13}$ is effected as in the preceding case. Phase $\phi_{13}$ is the disconnection phase for the second half path to be disconnected during which pulse $b'$ at cycle $t_0$ positions the register of the marking selector 31 in accordance with the address $A_0B_0C_0D_0$, at cycle $t_1$ orders the commencement of the marking of the line equipment from which results the disconnection of the half path which terminates there and at cycle $t_{12}$ orders the end of this marking. The transition to phase $\phi_{14}$ is effected at cycle $t_{16}$ as in the preceding case. Phase $\phi_{14}$ is the disconnection verification phase analogous with the connection verification phase $\phi_5$ with the only difference that as the parameters X and Y of the junctions of stages 12 and 16 are not known, the verification affects only the junctions of stages 13, 14 and 15 which must be found free. At cycle $t_0$ the registers of testers 43, 44 and 45 are positioned at time $b$ in accordance with the register 500 and a test pulse is applied to them at time $c$. If one of the tested junctions is engaged, a pulse reaches the "or" gate 803 connected to the "off" outputs of the three trigger circuits 843, 844 and 845 and is transmitted through the "and" gate 806 and the "or" gates 807 and 212 to the stop trigger circuit 213. In the contrary case the transition to the deconnection stop phase $\phi_{15}$ similar to phase $\phi_6$ takes place at cycle $t_1$.

We claim:

1. In a telephone system, a switch control circuit responsive to the service condition of a number of telephonic lines and circuits and an electronic switching network for the interconnection and disconnection of said lines and circuits as a function of a restricted number of orders from said switch control circuit, said electronic switching network comprising a space-division connection network and a logical means section called switching logic, said connection network being constituted of crosspoints arranged in rectangular matrices divided into a plurality of stages connected by single-wire junctions certain of which are parallel to one another, said connection network comprising methodical test means for effecting under the control of said switching logic and before any connection operation a test of the free or engaged condition of each junction which can take part in a path capable of connecting any two given telephonic lines or circuits linked to said connection network until such a complete path is determined or a blockage is indicated if none is available.

2. In a telephone system, a switch control circuit responsive to the service condition of a number of telephonic lines and circuits and an electronic switching network for the interconnection and disconnection of said lines and circuits as a function of a restricted number of orders from said switch control circuit, said electronic switching network comprising a space-division connection network and a logical means section called switching logic, said connection network being constituted of crosspoints arranged in rectangular matrices divided into a plurality of stages connected by single-wire junctions certain of which are parallel to one another, the number of said stages, the dimensions of the matrices of each stage and the number of said parallel junctions being determined by the optimum distribution of traffic to obtain the maximum number of simultaneous communications for a given number of crosspoints, said connection network comprising methodical test means for effecting under the control of the switching logic and before any connection operation a test of the free or engaged condition of each junction which can take part in the composition of a path capable of connecting any two given telephonic lines or circuits linked to the said connection network until such a complete path is determined or a blockage is indicated if none is available.

3. In a telephone system, a switch control circuit responsive to the service condition of a number of telephonic lines and circuits and an electronic switching network for the interconnection and disconnection of said lines and circuits as a function of a restricted number of orders from said switch control circuit, said electronic switching network comprising a space-division connection network and a logical means section called switching logic, said connection network being constituted of crosspoints arranged in rectangular matrices divided into a plurality of stages connected by single-wire junctions certain of which are parallel to one another, said connection network comprising methodical test means for effecting under the control of the switching logic and before any connection operation a test of the free or engaged condition of each junction which can take part in a path capable of connecting any two given telephonic lines or circuits linked to the said connection network until such a complete path is determined or a blockage is indicated if none is available, and connection means for effecting, under the control of said switching logic, the connection of a path found to be available between two lines or circuits designated by said switch control circuit by marking pulses having at least a part of their duration which is coincidental and during which only the crosspoints connecting the available junctions selected by said test operations are brought to the conductive condition and conduct a current which is twice the nominal current which passes through them after the suppression of the marking pulses.

4. In a telephone system, a switch control circuit responsive to the service condition of a number of telephonic lines and circuits and an electronic switching network for the interconnection and disconnection of said lines and circuits as a function of a restricted number of orders from said switch control circuit, said electronic switching network comprising a space-division connection network and a logical means section called switching logic, said connection network being constituted of crosspoints arranged in rectangular matrices divided into a plurality of stages connected by single-wire junctions certain of which are parallel to one another, said connection network comprising methodical test means for effecting under the control of the switching logic and before any connection operation a test of the free or engaged condition of each junction which can take part in a path capable of connecting any two given telephonic lines or circuits linked to the said connection network until such a complete path is determined or a blockage is indicated if none is available, and connection means for effecting, under the control of the switching logic, the connection of a path found to be available between two lines or circuits designated by said switch control circuit by marking pulses having at least a part of their duration which is coincidental and said switching logic comprising an independent time base, recording means for recording the addresses of telephonic lines or circuits to be connected provided by said switch control circuit and controlling means for controlling said methodical tests and the application of said marking pulses according to a clocked programme by the said time base.

5. In a telephone system, a switch control circuit responsive to the service condition of a number of telephonic lines and circuits and an electronic switching network for the interconnection and disconnection of said lines and circuits as a function of a restricted number of orders from said switch control circuit, said electronic switching network comprising a space-division connection network and a logical means section called switching logic, said connection network being constituted of crosspoints arranged in rectangular matrices divided into a plurality of stages connected by single-wire junctions certain of which are parallel to one another, said connection network comprising methodical test means for effecting under the control of the switching logic and before any connection operation a test of the free or engaged condition of each junction which can take part in a path capable of connecting any two given telephonic lines or circuits linked to the said connection network until such a complete path is determined or a blockage is indicated if none is available, connection means for effecting under the control of said switching logic, the connection of a path found to be available between two lines or circuits designated by said switch control circuit by marking pulses having at least a part of their duration which is coincidental and systematic test means enabling the verification after each connection operation that each of the junctions constituting the selected path is effectively engaged, and identification means for providing, in the contrary case, identification of the crosspoint to which the defect of operation is due.

6. A switching network according to claim 5, in which said methodic and systematic test means comprise for each stage of junctions a tester which permits the indication in a junction designated by said switching logic of the presence or absence of direct current on which is superimposed the speech frequency modulation.

7. A switching network according to claim 5 in which said switching logic comprise a common member for recording the identity of junctions, known as the "marking register" which operates in synchronism with said methodic test operations and stores the data necessary for the identification of the chain of junctions constituting the selected path.

8. A switching network according to claim 7 in which said connection means comprise for each stage of junctions a marking selector or "marker" applying under the control of said switching logic, a marking potential to a group of junctions of the stage in question comprising a junction the identity of which is recorded in said marking register in such a manner as to effect the operation by bilateral marking of the only crosspoints corresponding to the chain of selected junctions.

9. In a telephone system, a switch control circuit responsive to the service condition of a number of telephonic lines and circuits and an electronic switching network for the interconnection and disconnection of said lines and circuits as a function of a restricted number of orders from said switch control circuit, said electronic switching network comprising a space-division connection network and a logical means section called switching logic, said connection network being constituted of crosspoints arranged in rectangular matrices divided into a plurality of stages connected by single-wire junctions certain of which are parallel to one another, said connection network comprising methodical test means for effecting under the control of said switching logic and before any connection operation a test of the free or engaged condition of each junction which can take part in a path capable of connecting any two given telephonic lines or circuits linked to the said connection network until such a complete path is determined or a blockage is indicated if none is available, connection means for effecting, under the control of said switching logic, the connection of a path found to be available between two lines or circuits designated by said computer, identification means for recording the identity of said junctions, means for partially effecting the disconnection of a first part of a path to be disconnected of which one of the ends is identified by said switch control circuit, means for identifying the second end of said path and the various junctions which constitute it, means for transferring these items of data into said identification means, and said means for effecting the disconnection of the first part of the path also effecting disconnection of the second part of said path.

10. A switching network according to claim 9 comprising means for effecting a systematic test of the availability of the junctions which have served for the establishment of a disconnected path and means for supplying, in the case when the result of this test is negative, the identification of the defective crosspoint to which this result must be attributed.

11. A switching network according to claim 9, comprising means for effecting a simple periodic verification of the state of all the crosspoints of said connection network by a cyclic connection-disconnection test of all possible paths.

No references cited.

ROBERT H. ROSE, *Primary Examiner.*

WILLIAM C. COOPER, *Examiner.*